United States Patent [19]

Brown, III et al.

[11] Patent Number: 4,847,781

[45] Date of Patent: Jul. 11, 1989

[54] ENERGY MANAGEMENT SYSTEM

[75] Inventors: Robert J. Brown, III, Margate; Kenneth E. Brown, Boca Raton, both of Fla.

[73] Assignee: Associated Data Consoltants, Boca Raton, Fla.

[21] Appl. No.: 910,655

[22] Filed: Sep. 23, 1986

[51] Int. Cl.[4] .................... G06F 15/56; H01H 43/00; H04B 3/54; H04Q 1/18

[52] U.S. Cl. .............................. 364/492; 340/310 A; 340/825.06; 307/38; 364/143; 364/145; 364/505

[58] Field of Search ............... 364/492, 493, 495, 557, 364/483–505, 141–145; 340/310 A, 310 CP, 825.06, 825.5, 310 R; 307/38, 39, 40, 41; 358/86

[56] References Cited

U.S. PATENT DOCUMENTS

| | | | |
|---|---|---|---|
| 3,906,242 | 9/1975 | Stevenson | 364/493 |
| 4,213,182 | 7/1980 | Eichelberger et al. | 364/145 X |
| 4,217,646 | 8/1980 | Caltagirone et al. | 364/493 |
| 4,223,379 | 9/1980 | Simcoe | 364/144 |
| 4,244,022 | 1/1981 | Kendall | 364/420 |
| 4,264,960 | 4/1981 | Gurn | 364/493 |
| 4,345,162 | 8/1982 | Hammer et al. | 364/493 |
| 4,389,577 | 6/1983 | Anderson et al. | 364/493 |
| 4,418,333 | 11/1983 | Schwarzbach et al. | 340/810 A |
| 4,454,509 | 6/1984 | Buennagel et al. | 364/492 |
| 4,471,232 | 9/1984 | Peddie et al. | 307/38 |
| 4,540,984 | 9/1985 | Waldman | 340/825 |
| 4,661,914 | 4/1987 | Mulokey et al. | 364/557 |
| 4,695,880 | 9/1987 | Johnson et al. | 358/86 |
| 4,703,306 | 10/1987 | Barritt | 340/310 A |

FOREIGN PATENT DOCUMENTS 2495396 6/1982 France .................. 364/492

OTHER PUBLICATIONS

Tame, J. E., *Credit and Load Management System for an Electricity Utility*, "Electronics and Power", Oct. 1981, vol. 27, No. 10, pp. 705–707.

*Primary Examiner*—P. S. Lall
*Assistant Examiner*—Joseph L. Dixon
*Attorney, Agent, or Firm*—Harry W. Barron

[57] ABSTRACT

Described herein is an energy management system in which a central unit provides a series of energy managing signals over a medium, such as TV cables, power lines, telephone lines or free space radio frequency transmissions, to a plurality of subscriber units. Within each unit is a transponder which responds to the transmitted central unit signals and provides corresponding signals onto an electric grid, such as the power lines, within the subscribing unit. The appliances to be managed each have associated therewith a responder unit, which is coupled to the electric grid to receive the transponder provided signals. Each of the central unit transmitted signals is encoded to manifest the energy managing dictates of a particular one of a plurality of diffferent schedules and is only provided in conformance with the dictates of the schedule is manifests. Typically, where an appliance is to be turned off as part of the energy management scheme, the encoded signals are provided only when the schedule manifested thereby indicate that a particular appliance is to be turned off. The responder units each have subscriber settable encoding devices associated therewith and the subscriber sets the code of a particular schedule for each responder after referring to series of schedules which is supplied to each user of the energy management system. The responder then responds to only the codes applied thereto conforming to the code set on the settable encoding devices and the appliance with which that responder is associated is then managed in accordance with the selected schedule.

25 Claims, 12 Drawing Sheets

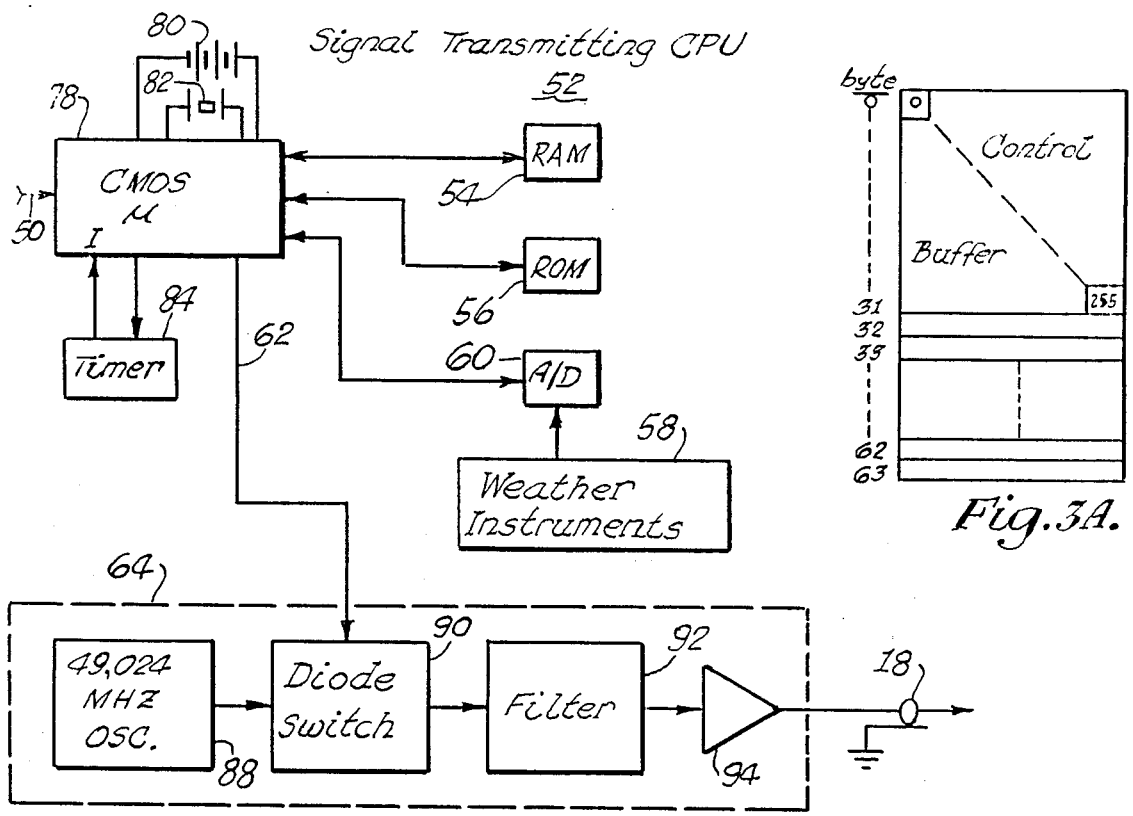
Fig. 3.
Fig. 3A.
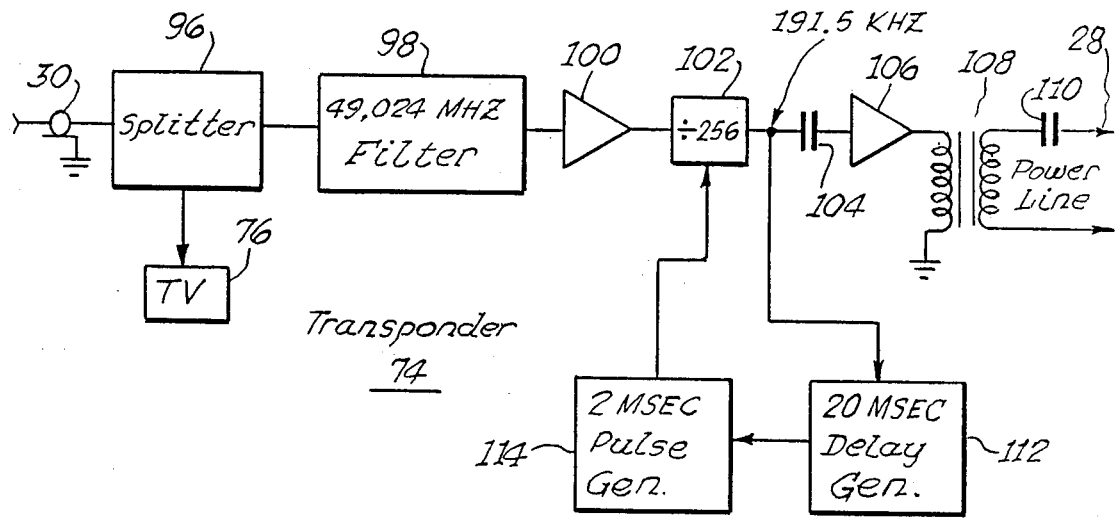
Fig. 4.

Fig.12A.

ELECTRIC AIR CONDITIONING CENTRAL SYSTEM

~ SOMEONE USUALLY HOME ~

| SLEEP FROM TO | 10:00PM 6:00AM | 11:00PM 7:00AM | 12:01AM 7:00AM | 1:00AM 8:00AM | 2:00AM 9:00AM |
|---|---|---|---|---|---|
| SUPER SAVINGS | H-1 V-0 | H-2 V-0 | H-3 V-0 | H-4 V-0 | H-5 V-0 |
| GOOD SAVINGS | H-6 V-0 | H-7 V-0 | H-8 V-0 | H-9 V-0 | H-10 V-0 |
| MODEST SAVINGS | H-11 V-0 | H-12 V-0 | H-13 V-0 | H-14 V-0 | H-15 V-0 |

NOTE: IF YOU GO AWAY ON A TRIP OR VACATION SET H-15 V-15

Fig.12B.

ELECTRIC AIR CONDITIONING CENTRAL SYSTEM

OCCUPANTS AWAY PART TIME

~ SUPER SAVINGS ~

| SLEEP FROM TO | 10:00PM 6:00AM | 11:00PM 7:00AM | 12:01AM 7:00AM | 1:00AM 8:00AM | 2:00AM 9:00AM |
|---|---|---|---|---|---|
| UNOCCU-PIED WEEK DAYS | | | | | |
| 7:30 AM TO 3:00PM | H-0 V-1 | H-1 V-1 | H-2 V-1 | | |
| 7:00 AM TO 5:00PM | H-3 V-1 | H-4 V-1 | H-5 V-1 | | |
| 8:00 AM TO 5:00PM | H-6 V-1 | H-7 V-1 | H-8 V-1 | | |
| 8:30 AM TO 5:30PM | H-9 V-1 | H-10 V-1 | H-11 V-1 | H-12 V-1 | |
| 8:30 AM TO 3:00PM | H-13 V-1 | H-14 V-1 | H-15 V-1 | H-0 V-2 | |
| 9:00 AM TO 3:00PM | H-1 V-2 | H-2 V-2 | H-3 V-2 | H-4 V-2 | |
| 9:00 AM TO 5:00PM | H-5 V-2 | H-6 V-2 | H-7 V-2 | H-8 V-2 | |
| 10:00 AM TO 4:00PM | H-9 V-2 | H-10 V-2 | H-11 V-2 | H-12 V-2 | H-13 V-2 |
| 12:01 PM TO 5:00PM | H-14 V-2 | H-15 V-2 | H-0 V-3 | H-1 V-3 | H-2 V-3 |

NOTE: IF YOU GO AWAY ON A TRIP OR VACATION SET H-15 V-15

Fig.12C.

ELECTRIC AIR CONDITIONING CENTRAL SYSTEM

OCCUPANTS AWAY PART TIME

— GOOD SAVINGS —

| SLEEP FROM TO | 10:PM 8:00AM | 11:00PM 7:00AM | 12:01AM 7:00AM | 1:00AM 8:00AM | 2:00AM 9:00AM |
|---|---|---|---|---|---|
| UNOCCU-PIED WEEK DAYS | | | | | |
| 7:30AM TO 3:00 PM | H-3 V-3 | H-4 V-3 | H-5 V-3 | | |
| 7:00AM TO 5:00 PM | H-6 V-3 | H-7 V-3 | H-8 V-3 | | |
| ⋯ | | | | | |
| 12:01PM TO 5:00PM | H-1 V-5 | H-2 V-5 | H-3 V-5 | H-4 V-5 | H-5 V-5 |

NOTE: IF YOU GO AWAY ON A TRIP OR VACATION SET H-15 V-15

Fig.12D.

ELECTRIC AIR CONDITIONING CENTRAL SYSTEM

OCCUPANTS AWAY PART TIME

— MODEST SAVINGS —

| SLEEP FROM TO | 10:00PM 6:00AM | 11:00PM 7:00AM | 12:01AM 7:00AM | 1:00AM 8:00AM | 2:00AM 9:00AM |
|---|---|---|---|---|---|
| UNOCCU-PIED WEEK DAYS | | | | | |
| 7:30AM TO 3:00PM | H-6 V-5 | H-7 V-5 | H-8 V-5 | | |
| 7:00AM TO 5:00PM | H-9 V-5 | H-10 V-5 | H-11 V-5 | | |
| ⋯ | | | | | |
| 12:01PM TO 5:00 PM | H-4 V-7 | H-5 V-7 | H-6 V-7 | H-7 V-7 | H-8 V-7 |

NOTE: IF YOU GO AWAY ON A TRIP OR VACATION SET H-15 V-15

LIGHTING SCHEDULES
OUTSIDE LIGHTS

| TURN ON TIME \ TURN OFF TIME | HALF HOUR BEFORE SUNSET | AT SUNSET | HALF HOUR AFTER SUNSET |
|---|---|---|---|
| 10:00 PM | H-7 V-9 | H-8 V-9 | H-9 V-9 |
| 11:00 PM | H-10 V-9 | H-11 V-9 | H-12 V-9 |
| 11:59 PM | H-13 V-9 | H-14 V-9 | H-15 V-9 |
| 1:00 AM | H-0 V-10 | H-1 V-10 | H-2 V-10 |
| 2:00 AM | H-3 V-10 | H-4 V-10 | H-5 V-10 |
| HALF HOUR BEFORE SUNRISE | H-6 V-10 | H-7 V-10 | H-8 V-10 |
| AT SUNRISE | H-9 V-10 | H-10 V-10 | H-11 V-10 |

*Fig. 12E.*

WATER HEATING SCHEDULES
ELECTRIC WATER HEATERS

| DISHWASHING TIME \ LAUNDRY DAYS | 4:00 PM 8:00 PM | 6:00 PM 10:00 PM | 8:00 AM 10:00 AM | 12:01 PM 2:00 PM |
|---|---|---|---|---|
| MONDAY | H-3 V-12 | H-4 V-12 | H-5 V-12 | H-6 V-12 |
| TUESDAY | H-7 V-12 | H-8 V-12 | H-9 V-12 | H-10 V-12 |
| WEDNESDAY | H-11 V-12 | H-12 V-12 | H-13 V-12 | H-14 V-12 |
| THURSDAY | H-15 V-12 | H-0 V-13 | H-1 V-13 | H-2 V-13 |
| FRIDAY | H-3 V-13 | H-4 V-13 | H-5 V-13 | H-6 V-13 |
| SATURDAY | H-7 V-13 | H-8 V-13 | H-9 V-13 | H-10 V-13 |
| SUNDAY | H-11 V-13 | H-12 V-13 | H-13 V-13 | H-14 V-13 |
| MONDAY AND WEDNESDAY | H-15 V-13 | H-0 V-14 | H-1 V-14 | H-2 V-14 |
| MONDAY AND THURSDAY | H-3 V-14 | H-4 V-14 | H-5 V-14 | H-6 V-14 |
| TUESDAY AND THURSDAY | H-7 V-14 | H-8 V-14 | H-9 V-14 | H-10 V-14 |
| NONE | H-11 V-14 | H-12 V-14 | H-13 V-14 | H-14 V-14 |

NOTE: IF YOU GO AWAY ON A TRIP OR VACATION SET H-15 V-15

*Fig. 12F.*

PUMP SCHEDULES
SWIMMING POOL AND HOT TUBS

| TURN ON TIME \ TURN OFF TIME | 9:00 AM | 10:00 AM | 11:00 AM | 12:01 AM | 8:00 PM | 9:00 PM |
|---|---|---|---|---|---|---|
| 2:00 PM | H-12 V-10 | H-13 V-10 | *H-14* *V-10* | | | |
| 3:00 PM | H-15 V-10 | H-0 V-11 | H-1 V-11 | *H-2* *V-11* | | |
| 4:00 PM | H-3 V-11 | H-4 V-11 | H-5 V-11 | H-6 V-11 | | |
| 9:00 PM | | *H-7* *V-11* | H-8 V-11 | *H-9* *V-11* | | |
| 10:00 PM | | | H-10 V-11 | *H-11* *V-11* | *H-12* *V-11* | |
| 11:00 PM | | | | H-13 V-11 | *H-14* *V-11* | *H-15* *V-11* |
| 11:59 PM | | | | | *H-0* *V-12* | *H-1* *V-12* |
| 1:00 AM | | | | | | *H-2* *V-12* |

*Fig. 12G.*

*For Air Conditioning - Sleep Time - Midnight - 7:00AM*

Usually Home - Super Savings  H-3, VO

| DAYS | TS# | TS #4 | | | CT INF | |
|---|---|---|---|---|---|---|
| | | ON | OFF | CT# | | |
| Sun/Hol | 4 | 0:00 | 1:00 | 8 | Interval | 30 |
| Mon | 4 | 1:00 | 6:00 | 15 | Winter/ | 0 |
| Tues | 4 | 6:00 | 6:45 | 0 | Max.OFF | 8 |
| Wed | 4 | 6:45 | 14:00 | 12 | Min.OFF | 1 |
| Thur | 4 | 14:00 | 0:00 | 8 | CT WF | 1 |
| Fri | 4 | | | | | |
| Sat | 4 | | | | | |

*Fig. 13A.*

Usually Home - Good Savings  H-8, VO

| DAYS | TS# | TS #4 | | | CT INF | |
|---|---|---|---|---|---|---|
| | | ON | OFF | CT# | | |
| Sun/Hol | 7 | 0:00 | 1:00 | 9 | Interval | 30 |
| Mon | 7 | 1:00 | 6:00 | 12 | Winter/ | 0 |
| Tues | 7 | 6:00 | 6:45 | 0 | Max.OFF | 9 |
| Wed | 7 | 6:45 | 14:00 | 9 | Min.OFF | 1 |
| Thur | 7 | 14:00 | 0:00 | 3 | CT WF | 1 |
| Fri | 7 | | | | | |
| Sat | 7 | | | | | |

*Fig. 13B.*

Usually Home - Modest Savings  H-13, VO

| DAYS | TS# | TS #18 | | | CT INF | |
|---|---|---|---|---|---|---|
| | | ON | OFF | CT# | | |
| Sun/Hol | 18 | 0:00 | 1:00 | 5 | Interval | 30 |
| Mon | 18 | 1:00 | 6:00 | 9 | Winter/ | 0 |
| Tues | 18 | 6:00 | 6:45 | 0 | Max.OFF | 9 |
| Wed | 18 | 6:45 | 14:00 | 5 | Min.OFF | 1 |
| Thur | 18 | 14:00 | 0:00 | 2 | CT WF | 1 |
| Fri | 18 | | | | | |
| Sat | 18 | | | | | |

*Fig. 13C.*

For: Air Conditioning-Sleep Time-Midnight- 7:00AM

Away 8:00-5:00   Super Saving           H-8, V1

| DAYS | TS# | TS #27 | | | CT INF | |
|---|---|---|---|---|---|---|
| | | On | OFF | CT# | | |
| Sun/Hol | 4 | 0:00 | 1:00 | 8 | Interval | 30 |
| Mon | 27 | 1:00 | 6:00 | 15 | Winter | 0 |
| Tues | 27 | 6:00 | 6:45 | 0 | Max.OFF | 8 |
| Wed | 27 | 6:45 | 8:00 | 12 | Min OFF | 1 |
| Thur | 27 | 16:30 | 0:00 | 8 | CT WF | 1 |
| Fri | 27 | | | | | |
| Sat | 4 | | | | | |

*Fig.13D.*

Away 8:00-5:00   Good Savings           H-11, V3

| DAYS | TS# | TS #63 | | | CT INF | |
|---|---|---|---|---|---|---|
| | | ON | OFF | CT# | | |
| Sun/Hol | 7 | 0:00 | 1:00 | 9 | Interval | 30 |
| Mon | 63 | 1:00 | 6:00 | 12 | Winter | 0 |
| Tues | 63 | 6:00 | 6:45 | 0 | Max. OFF | 5 |
| Wed | 63 | 6:45 | 8:00 | 9 | Min. OFF | 1 |
| Thur | 63 | 16:30 | 0:00 | 3 | CT WF | 1 |
| Fri | 63 | | | | | |
| Sat | 7 | | | | | |

*Fig.13E.*

Away 8:00-5:00   Modest Savings          H-14, V5

| Day | TS# | TS #98 | | | CT INF | |
|---|---|---|---|---|---|---|
| | | ON | OFF | CT# | | |
| Sun/Hol | 18 | 0:00 | 1:00 | 9 | Interval | 30 |
| Mon | 98 | 1:00 | 6:00 | 0 | Winter | 0 |
| Tues | 98 | 6:00 | 6:45 | 5 | Max.OFF | 5 |
| Wed | 98 | 6:45 | 8:00 | 2 | Min.OFF | 1 |
| Thur | 98 | 16:30 | 0:00 | 9 | CT WF | 1 |
| Fri | 98 | | | | | |
| Sat | 18 | | | | | |

*Fig.13F.*

For: Air Conditioning --Away Noon--5:00

Sleep 10:00 PM-6:00 AM  Super Savings  H-14,V2

| DAYS | TS# | TS # 54 | | | CT INF | |
|---|---|---|---|---|---|---|
| | | ON | OFF | CT# | Interval | 30 |
| Sun/Hol | 10 | 0:00 | 5:00 | 15 | Winter/ | 0 |
| Mon | 54 | 5:00 | 5:45 | 0 | Max.OFF | 15 |
| Tue | 54 | 5:45 | 12:00 | 12 | Min.OFF | 1 |
| Wed | 54 | 16:30 | 23:00 | 8 | CT WF | 1 |
| Thur | 54 | 23:00 | 0:00 | 15 | | |
| Fri | 54 | | | | | |
| Sat | 10 | | | | | |

Fig.13G.

Sleep 11:00 PM - 7:00 AM  Super Savings  H-15,V2

| DAYS | TS# | TS# 50 | | | CT INF | |
|---|---|---|---|---|---|---|
| | | ON | OFF | CT# | Interval | 30 |
| Sun/Hol | 11 | 0:00 | 6:00 | 15 | Winter | 0 |
| Mon | 50 | 6:00 | 6:45 | 0 | Max.OFF | 15 |
| Tues | 50 | 6:45 | 12:00 | 12 | Min.OFF | 1 |
| Wed | 50 | 16:30 | 0:00 | 8 | CT WF | 1 |
| Thur | 50 | | | | | |
| Fri | 50 | | | | | |
| Sat | 11 | | | | | |

Fig.13H.

Sleep 11:00 PM - 7:00 AM  Good Savings  H-2,V5

| DAYS | TS# | TS# 86 | | | CT INF | |
|---|---|---|---|---|---|---|
| | | ON | OFF | CT# | Interval | 30 |
| Sun/Hol | 14 | 0:00 | 6:00 | 12 | Winter/ | 0 |
| Mon | 86 | 6:00 | 6:45 | 0 | Max.OFF | 12 |
| Tues | 86 | 6:45 | 12:00 | 9 | Min.OFF | 1 |
| Wed | 86 | 16:30 | 0:00 | 3 | CT WF | 1 |
| Thur | 86 | | | | | |
| Fri | 86 | | | | | |
| Sat | 14 | | | | | |

Fig.13I.

ENERGY MANAGEMENT SYSTEM

This application has an similar disclosure to that of Ser. No. 910,655, filed even date herewith and assigned to the assignee hereof.

This invention relates to an energy management system and more particularly to such a system under the control of a processor located at a remote point which can be utilized to control energy usage in a plurality of premises.

In recent years it has become more desirable to manage and control the amount of energy an appliance consumes due to the ever rising cost of electricity, oil and natural or bottled gas. Businesses and commercial buildings have been installing sophisticated energy management systems under the control of computers to monitor and control the amount of energy consumed by various appliances. For example, air conditioning and hot water heaters have been monitored and controlled to cool the air or heat the water only during the time the premise is occupied. Other more sophisticated energy management techniques include providing monitoring equipment at many places throughout a building and turning on and off certain point contacts controlling heating or cooling, based on inputs from the monitoring equipment. The monitoring equipment generally will vary the heating or cooling in response to external conditions, such as temperature, humidity, lightness or darkness and the like, as well as individual comfort within the building.

The external conditions used by present day energy management systems to determine the amount of energy management needed will be common for premises throughout an entire area. For example, if it is raining on a particular building, the chances are great that it is raining on the buildings next door and the need for air conditioning both those buildings will be reduced due to the weather condition. However, with the present state of the art systems, each of the buildings will require its own energy management system, including sophisticated and expensive monitoring apparatus, which duplicates determining external conditions, such as weather factors.

While the amount of energy cost saving in a commercial building, particularly large office buildings, can be significant enough to warrant the expense of sophisticated energy management systems, the average homeowner cannot achieve a large enough savings to justify the cost of expensive energy management schemes. However, the total amount of energy to be saved from all homes will be very significant, from a national energy policy view, even though the individual cost savings per home may not justify the expense involved in installing a sophisticated system in each home. Even a simple home system would require the installation of a computer system and extensive wiring of the energy monitoring and controlling devices within the home. Unfortunately, the pay back period for such an investment is too great to encourage the average homeowner to control his energy cost by these techniques.

Within the home, one can reduce the traditional costs of energy management systems by utilizing existing wiring, such as the existing power distribution system, throughout a home to transmit signals at a frequency much greater than the normal 60 hertz power frequency. These superimposed control signals can then be received by units associated with each of the various devices to be controlled and appropriate control can be accomplished. Such a system of distributing energy control signals has been described in U.S. Pat. No. 4,132,355 in the name of Robert J. Cleary and entitled "Electronic Temperature Control System". One of the problems with the Cleary type system is that no special considerations is given to external factors, such as the weather, in determining when a system is to be rendered operative or inoperative. In fact all that Cleary does accomplish is to turn off certain energy consuming appliances during a time the building is not in use. Much additional control can, and should, be made for many energy consuming appliances to reduce the energy cost without effecting the comfort or utility of the appliance. For example, a hot water heater can be controlled to be off during certain periods of the day if no hot water usage normally occurs during those periods. None of these features are addressed by the Cleary apparatus.

Additionally, it would be desirable that the expensive control processor portion of modern energy management systems be shared by many different housing units, rather than providing such a unit for each single premise. This is true whether the premise is a home or a large office building or a factory. As previously mentioned, when the weather effects one premise, it effects the neighboring premise in the same manner. In fact, the weather conditions generally throughout a rather large area, of many tens or even hundreds of square miles, is likely to be the same. Thus, many consumers in an entire city or even several cities could share common weather monitoring instrumentation. In order to share weather instrumentation, it is necessary to provide appropriate signals to each user's facility. At the same time, it still is necessary to allow the user to selectively control certain features, such as comfort level or individualized times that the premise is unoccupied, while allowing the central instrumentation facility to control certain other features.

In accordance with one aspect of this invention, there is provided an energy management system for managing the energy usage of an appliance in accordance with a user selected one of a plurality of different schedules, each schedule defining different times periods and amounts of management to occur. The system comprises a central signal transmitting unit for providing encoded signals, one after another, each encoded signal manifesting the code of a schedule defining that energy management is to then occur. The system further includes a responder unit coupled in circuit with the appliance, which responder unit includes user settable encoding means and has the transmitting unit signals applied thereto. The responder unit responds to only those encoded transmitting unit signals having the same code as the code set on the user settable encoding means to manage the energy usage of the appliance.

One preferred embodiment of the subject invention is hereafter described with reference being made to the following Figures, in which FIG. 1 shows an overall system block diagram of the energy management system of the subject invention;

FIG. 3 shows a more detailed block diagram of the signal transmitting computer shown in FIG. 2;

FIG. 3A shows the organization of RAM 54.

FIG. 4 shows a more detailed block diagram of the transponder unit shown in FIG. 2;

FIGS. 12A through 12G are charts showing the various available settings for the responder unit in order to accomplish predefined energy management of various types of energy consuming appliances;

FIGS. 13A through 13I are charts useful in understanding the differences between various responder unit settings and the amount of energy control which occurs for selected settings;

Figure 1:
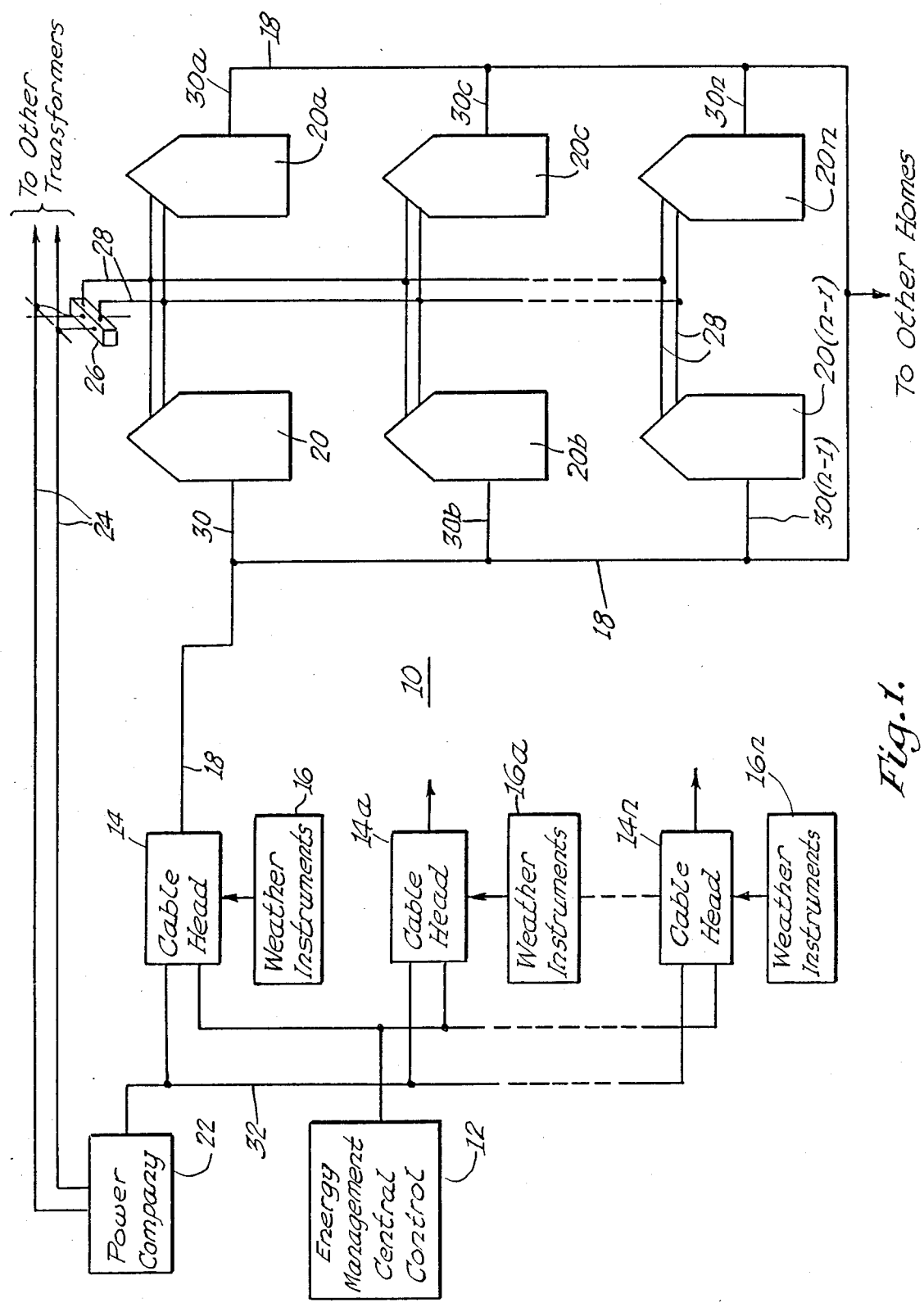

Referring now to FIG. 1, the overall energy management system 10 is shown. The heart of the system is controlled by the energy management central control 12, which sends signals to a plurality of different cable head systems 14, 14A ... 14N. Each of the cable heads 14, 14A ... 14N may be a cable television signal transmission facility which serves all, or part of, a city or other large area. There may be a single energy management central control 12 which serves all of the cable heads 14, 14A ... 14N throughout the country over telephone or satellite communication paths or there maybe an energy management central control 12 to serve a region of the country or even a region of a state.

Each of the cable heads 14, 14A ... 14N has associated therewith a weather instrument system 16, 16A ... 16N which provides weather information to the cable head computers. The information from the weather instrument 16, 16A ... 16N, as well as the signals from the energy management central control 12, are used by computers within each of the cable heads 14, 14A ... 14N to provide a unique system for the particular area which the cable heads 14, 14A ... 14N serves.

A series of encoded signals, defined by schedules stored in the computers associated with each of the cable heads 14, 14A ... 14N, is provided over cable lines 18 to individual homes, or other user's premises 20, throughout the area served by the individual cable head 14, 14A ... 14N. In addition, each of the homes 20 ... 20N is provided with electric power from the power company 22 over system wide power lines 24. As is well know, the system wide power lines 24 are connected to various transformers 26 which provide power over local power lines 28 to the individual homes 20, 20A ... 20N. Throughout an entire area served by a power company 22, many such transformers 26 are provided and each provide power to a relatively small area of users premises 20, 20A ... 20N. Within each of the users premises 20, 20A ... 20N, electric wires connected to the power lines 28 are coupled throughout the premise so that many energy consuming appliances can receive power from the power applied over local power lines 28.

The encoded control signals provided from cable head 14 over cable lines 18 are provided to each of the houses 20, 20A ... 20N over a local cable line 30, 30A ... 30N coupled to cable line 18. The encoded signals provided over lines 18 and 30, 30A ... 30N may be decoded by a unit within each of the homes 20, 20A ... 20N, in a manner to be described hereafter, and then be applied over the power lines internal to the house 20, 20A ... 20N to control a responder device, which will be described in more detail hereafter, which disables the appliance from using power during selected periods. Such selected periods may be, for example, while the house is unoccupied, in the case of air conditioning or hot water, or the selected periods may be defined to control the time a sprinkler system pump is operational. In the case of the sprinkler system pump, the amount of rainfall during a preceeding defined period of time would be a factor in the duration of the selected period, if any, that the pump is rendered operational.

In addition to managing energy consuming appliances, the energy management system 10 can be used to assist the power company 22 during periods when energy demand is greater than the available energy supply. A power shed control line 32 may be coupled from the power company 22 to each of the cable heads 14, 14A ... 14N to modify the normal signals provided from the cable heads over cables 18 in the event it is necessary to reduce the power consumption in the overall area. For example, on an extremely hot day when many air conditioners are running, the power generation capability of the power company may become overtaxed. In this event, power companies traditionally have caused brown outs or selective black outs in the area to reduce the overall demand on the power generation equipment. With the energy management system 10, it would be possible for the power company to send signals over line 32 to each, or selected ones, of the cable heads 14, 14a ... 14n to cause the energy control signals provided over cables 18 to disable for selective periods of time only certain high energy consuming appliances, such as hot water heaters or air conditioners, rather than to brown out or black out all of the appliances for all of the premises in a particular area.

Figure 2:
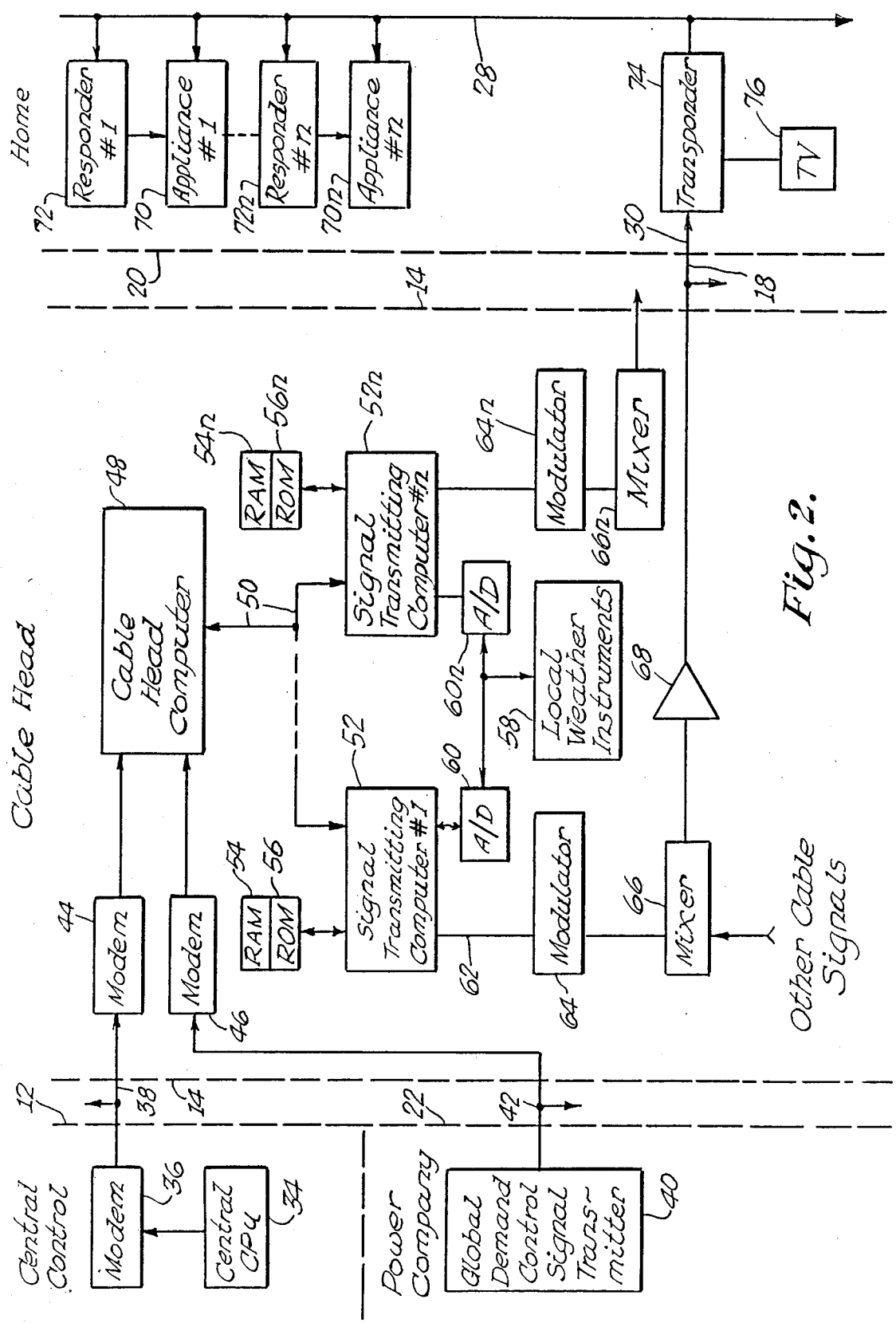
FIG. 2 shows a more detailed block diagram of the various components shown in FIG. 1.

Referring now to FIG. 2, a more detailed electrical block diagram of the various components in each of the energy management central control 12, cable head 14, home 20, and power company 22 is shown. Within the energy management central control 12, a central computer 34 is used to provide signals through a modem 36 and the conventional long distance telephone network 38 to control each of the various cable heads 14. The signals which central computer 34 sends to the various cable heads 14 will generally be of a type to change the schedules in the computers within the cable heads 14 so that different types of energy management control signals may be sent therefrom. Examples of such changes include modifying the schedules on account of longer or shorter days as the seasons change.

Within the power company 22 facility, a global demand shed signal transmitter 40, which may be a simple personal computer transmitting a global demand shed signal, or specifically addressed demand shed signals, over a modem to all, or one or more, cable heads 14 in a selected area. Transmitter 40 would only provide a signal if it were necessary for the power company 22 to cause a forced reduction in the demand for electricity in a certain area or certain areas. These signals provided from transmitter 40 would be provided to the cable heads which control the areas in which the global demand was to be reduced.

The advantage of this type of a signal is that rather than blacking out or browning out certain small areas, selected high energy usage appliances, such as water heaters or air conditioners, could be turned off for short periods. Because each cable head serves a relatively small area compared to the area served by a power company, the water heaters could first be turned off in groups at a time and for limited periods, so that no individual dwelling unit would have the water heater continuously turned off. If additional demand reduction were required, all water heaters could be turned off and then selected groups of air conditioners could be turned off for five or ten minutes; each of the selected areas, of course, could include multiple cable heads.

Referring now to the cable head 14, a pair of modems 44 and 46 receive the respective signals provided over lines 38 and 42 from central control 12 and power company 22. The outputs from each of the modems 44 and 46 are provided to a cable head central processor unit 48, which stores the various schedules and determines the application of particular codes at any given time from cable head 14 to the various homes 20. Cable head Computer 48 may be any conventional personal computer, such as an IBM personal computer XT or the like. Computer 48 will receive signals from the central Computer 34 containing data manifesting each of the various schedules and then storing this data in a permanent memory, such as a hard disk. There may be, for example, 256 different schedules, each of which is defined to control a specific appliance under a specific defined circumstance. Examples of selective ones of the schedules will be given hereafter with respect to FIGS. 12A through 12G. For purposes of FIG. 2, it is necessary to understand that each of the 256 schedules will contain a series of times, or time intervals, during which no control signals are provided for a particular appliance, whereby that appliance will be allowed to be turned on in the manner it would be normally be turned on, such as in response to a thermostat. At other times, signals will be applied encoded for a specific appliance for the purpose of inhibiting that appliance from responding to being turned on in the normal manner, such as in response to the thermostat. For other appliances, signals will be sent to turn on a normally off device, such as a sprinkler system pump.

It should be understood that the signals from cable head 14 will not turn on the particular appliance in all instances. That determination will be made in conjunction with other apparatus associated with the appliance, such as a thermostat for a heater, air conditioner or hot water heater. In other instances the time schedules contained within cable head computer 48 will in fact cause the particular appliance to be turned on or turned off, as would be the case with respect to a sprinkler system pump or internal or external lights.

Signals manifesting the schedule mandated signals, or a lack of signals, are provided over line 50 to one or more signal transmitting Computers 52 . . . 52N. At any given cable head system, there may be one or more signal transmitting Computers 52 . . . 52N, depending on the size of the area served by that particular cable head. As is well known, some cable heads can serve many hundreds of square miles in area and weather conditions throughout that large area can be significantly different. In those situations, it may be desirable to provide a plurality of different signal transmitting Computers each with its own weather instruments to allow the energy signals provided from the cable head to various neighborhoods to independently vary with respect to one another depending on the local weather conditions. Hereafter, only a single signal transmitting Computer 52 will be described in detail, although it should be understood that any number of such devices may be placed within a given cable head.

Associated with the signal transmitting Computers 52 is random access memory (RAM) 54 and read only memory (ROM) 56. The read only memory 56 may contain a control program for operating the microprocessor chip included within Computer 52. In addition, a series of weather instruments 58, generally positioned outside of the building containing the cable head equipment, provides signals through an analog to digital converter (A/D) associated with or included within Computer 52. While only a single block for the local weather instruments 58 is shown in FIG. 2, it should be understood that each of the signal transmitting Computers 52 . . . 52N may have their own set of weather instruments which are located either at the cable head site or at an area remote therefrom in conjunction with the area to be energy managed.

As previously mentioned, computer 48 contains a series of 256 different energy management schedules. For each of these schedules, an entire 24 hour period is covered during which signals are provided for managing the energy usage. Within the RAM 54 associated with computer 52, a command buffer block of 256 bits is defined in which each of the 256 schedules associated with computer 48 is assigned to one of the bits. At any given instance in time, either a logic one or logic zero is placed in each bit of the 256 bit command buffer, manifesting the then instantaneous desire to either limit or not limit energy usage, as dictated by each of the corresponding 256 schedules.

In addition to the 256 bit command buffer, RAM 54 contains thirty-two additional bytes in which the digitized local weather instrument readings may be stored, as well as a series of words dedicated to storing time and date information and control information. Each of these bytes of RAM 54 may be read by computer 48 sending appropriate signals over line 50 to cause computer 52 to send back to computer 48 the requested data. In response to the data received by computer 48, for example, the words related to the weather instrument information, computer 48 can modify the energy management schedules in an appropriate manner. Thus, if the weather instrumentation indicates that the outside conditions are hot, humid and sunny, computer 48 may modify the air conditioning schedules to allow air conditioners to run for a longer period of time. On the other hand, if it is cool and rainy outside, computer 48 may modify the air conditioning schedule to turn off air conditioners for a greater period of time, and may further modify the lawn sprinkler pump schedule to not turn on the pump that day.

Computer 52, should include low power consuming components, such as a microprocessor, memory and other devices fabricated with CMOS technology.

While normally the power received to operate computer 52 would be conventional electrical power, a backup battery (not shown) will be associated with computer 52 to maintain the correct information during any period of a power interruption at the cable head 14. It is particularly necessary to maintain information related to time and date information, so that the appropriate schedules can be provided by computer 48 when power returns. For this reason, RAM memory 54 associated with computer 52 contains the time and date information and during power interruptions, this information is maintained and updated. Such battery backup should also be used with some parts of the weather instruments 16, such as a rain gauge which tips after each certain amount of rain.

Computer 52 provides, at an output thereof coupled to line 62, a signal manifesting the various energy management command signals. The output signal provided to line 62 contains a signal in which an eight bit binary pulse-width modulated code is provided one or more times for each of the schedules then requiring a control signal to be provided. As will be explained in more detail hereafter, each provided eight bit coded signal will cause a particular device, called a responder, associated with a particular appliance, to respond in a certain way. Typically, the response will be to inhibit the operation of the energy consuming appliance, although under certain circumstances the response will be to turn on the energy consuming appliance. By using an eight bit binary code, each of the 256 different schedules can be individually defined. If more than 256 schedules are desired, a larger number of bits could be used or a tertiary code could be used. In this case, the 256 bit block of RAM 54 would need to be correspondingly increased in size.

The pulse-width modulated signal applied to line 62 is provided to a modulator 64, which provides a high frequency signal at 49.024 megahertz during each time the signal on line 62 is at a high or logic "1" state. The 49.024 megahertz signal frequency was selected because when it is divided by 256 (Standard eight bit counter) it equals 191.5 kilohertz, and standard crystals are available for 191.5 kilohertz. Further, the 49.024 frequency is within the lower guard band of a normal cable television system frequency response and is normally unused.

The 49.024 megahertz signal provided from modulator 64 is then provided to a mixer 66. The other signals normally generated at the cable heads, such as the cable TV signals, are also applied to mixer 66 where the energy management and other signals are combined and amplified by an amplifier 68 and provided out over the cable network 18.

Referring now to the home portion 20 shown in FIG. 2, in any given home, a plurality of energy consuming appliances 70 . . . 70N are present. Such appliances, for instance, could be air conditioners, heaters, water heaters, swimming pool pumps, lawn sprinkler systems, lights and the like. Associated with each of the appliances 70 . . . 70N is a responder unit 72 . . . 72N. Each of the responder units are coupled in circuit with the appliance so that the responder unit can either prevent an appliance 70 from being turned on or allow an appropriate signal to be provided turning on the appliance 70. The particular type of responder 72 is selected based on the type of appliance. For example, for a heater, air conditioner, water heater and the like, the responder unit 72 associated therewith would be a type which controls the thermostat to prevent the appliance 70 from being turned on during selected periods. On the other hand, if the appliance 70 where outside lights, which were desired to be automatically turned on at sunset and automatically turned off at sunrise, the signals provided from responder units 72 would control a switch to allow the lights to be turned on automatically. Alternatively, the normal light switch could be turned to the on position and the responder unit 72 could be the type which would disable the power from being applied to the lights. The particular type of responder unit selected would be based on the desired default condition in the event the signals from cable head 14 are interrupted, due to, for instance, a power failure at the cable head 14, or a broken cable line 18 or 30.

A transponder unit 74 is centrally located in the home adjacent to where the cable 30 enters the home. Typically, this will be an area near a TV set 76. The transponder unit 74 includes a signal splitter which splits the signals mixed at mixer 66 such that the TV signals are provided to the TV 76 and the energy management control signals provided at 49.024 Mhz from modulator 64 are frequency divided by 256 and provided to the power lines 28 running throughout the home.

Each of the responder units 72 . . . 72N are also coupled to the electrical power network 28 running throughout the house. The responder units 72 . . . 72N include means to filter and only respond to the high frequency signals provided from transponder 74 over the power lines. A decode circuit is included with each of the responders 72 . . . 72N and is controlled by a pair of user settable thumb wheels (not shown in FIG. 2) in which the homeowner sets a code defined by a desired schedule for controlling the particular appliance. Each of the codes settable for a transponder will conform to one of the 256 schedules stored in Computer 48 at the cable head. The eight bit codes provided for each of the schedules over the cable 18, when converted by the transponder 74 and applied over the power lines 28, will be applied to each decoder circuit. When a code equivalent to a particular responder 72 . . . 72N thumbwheel settings is recognized, the appropriate appliance energy control occurs.

It is desired that the responder units 72 . . . 72N be fail safe. Thus, the responder units default condition will be to eliminate the energy control of the appliance 70 . . . 70N with which they are associated if the system fails to function. Such a failure could be due to either a lack of signals from cable head 14 or a component failure in the transponder 74 or responder 72 devices. Accordingly, the codes, which are provided over cable 18 to transponder 74 and subsequently over the power line network 28, will typically manifest to the responder unit 72 . . . 72N which recognizes that code to issue signals to turn off a particular appliance. The reason for this, of course, is that if, for example, the cable system loses power, or the responder malfunctions, the controlled appliance will still function as previously set.

Referring now to FIG. 3, a more detailed diagram of the signal transmitting computer 52 is shown. The heart of computer 52 is a CMOS microprocessor 72, which may be, for example, an CDP-1805ACE microprocessor, manufactured by R.C.A. Corp. A CMOS microprocessor has the important feature that it draws very low power. The CDP-1805ACE includes microprocessor 78, RAM 54 and timer 84 on the same chip.

In the application described in FIG. 2, it can be seen that the energy management scheme is very dependent on providing proper signals at the proper time, that is, whenever a certain time occurs, a certain action is to occur. Thus, it is important to maintain the correct time even if the power at the cable head 14 is interrupted. In order to accomplish this, a battery 80 is attached to microprocessor 78. In FIG. 3, microprocessor 80 as well as RAM 54 are shown as separate blocks; however, in practice they may all be within the same computer chip and battery 80 also maintains the integrity of the data within RAM 54.

As previously indicated, the weather instruments 58 apply an analog signal through analog to digital (A/D) converter 60. Microprocessor 78 communicates in a known manner with A/D converter 60 to update the files contained within RAM 54 with the most current weather information provided by weather instruments 58. Microprocessor 78 also has a crystal 82 attached thereto for controlling the clock speed thereof. In addition, a time 84 is shown as providing a signal to an interrupt (I) input and is responsive to signals provided thereto from microprocessor 78 to set the time at which the interrupt signal will be provided. Again, in practice, timer 84 may be a part of the same chip as microprocessor 78, but is shown schematically as a separate block in FIG. 3.

The organization of RAM 54 is shown in FIG. 3A. RAM 54 may include 64 bytes of memory, addressed as 0-63. As is well known, each byte of memory includes eight individual logic "1" or logic "0" bits. The first 32 bytes, numbered 0-31, are the command buffer, in which is stored each of the 256 schedules bits. These bytes are continually updated by cable head computer 48 based on the schedule information. The remaining 32 bytes of memory 54 are organized to hold data as follows:

| | |
|---|---|
| A/D output | 16 bytes |
| Time | 3 bytes |
| Date | 3 bytes |
| Power Fail Counter | 1 byte |
| EOI/Demand | 1 byte |
| Number of Responder Shots | 1 byte |
| Time-Out Counter | 2 bytes |
| Command Being Sent | 1 byte |
| Stack | 4 bytes |

As previously mentioned, computer 48 is in continuous communication with microprocessor 78 over line 50, which may be any conventional interface arrangement, such as an RS-232 protocol. During this communication, computer 48 will read certain information, such as the weather related information stored in the 16 bytes associated with the A/D converter 60. In response to this information, computer 48 will modify certain of the schedules it has stored to provide the proper energy management in view of the then existing weather conditions. In addition, if a power outage occurs in cable head 14, computer 48 will be programmed to communicate with microprocessor 78 when power is restored to find the correct time, as maintained in RAM 54. Further, computer 48 can send commands to microprocessor 78 in the form of data for storage in RAM 54. For example, computer 48 will cause a number to be stored in the "Number of Responder Shots" byte of RAM 54 manifesting how many times the same eight bit code is to be provided before the next eight bit code is provided. Of course, computer 48 will be continuously updating the instantaneous schedule data within the first 32 bytes, or 256 bits, of RAM 54.

ROM 56 contains a program for controlling microprocessor 78 to provide an eight bit code manifesting the address of each location in the 256 bit schedule section of RAM 54 containing a logic "1". Thus, if bit locations 1, 5 and 10 contain logic "1" and the remaining bit locations contain logic "0", three separate 8 bit codes manifesting the binary number 1, 5 and 10 will be transmitted at the output 62 of microprocessor 78. As will be explained hereafter, it will be necessary to send each of the codes a plurality of times, such as 3 or 4. The exact number of times each code is sent will be determined by the number stored in the "Number Of Responder Shots" byte of RAM 54.

Figure 8:
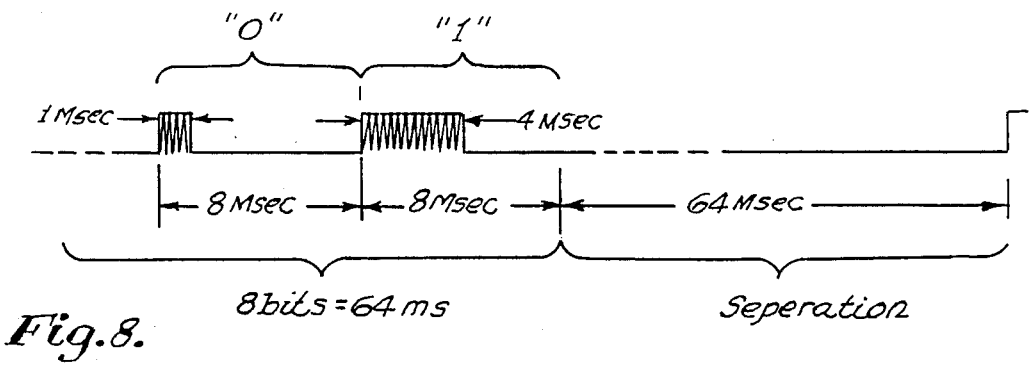
FIG. 8 is a diagram useful in understanding the signal transmitted to the responder unit shown in FIG. 5.
Figure 9:
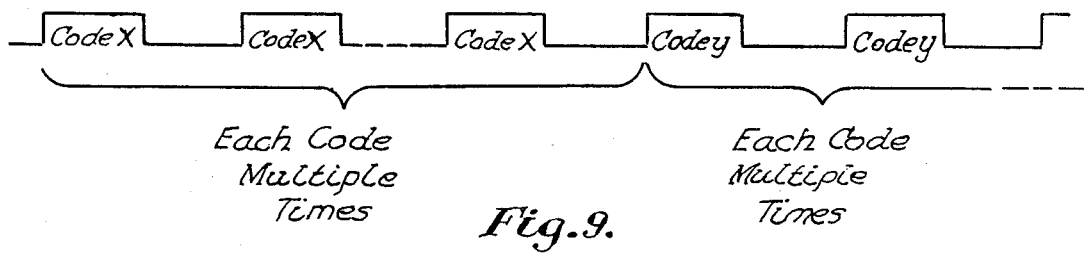
FIG. 9 is a diagram useful in understanding how the code is provided to the decoder portion of the responder unit shown in FIG. 5.

The encoding of the data manifesting the address of the bit locations storing logic "1" bits transmitted over line 62 will be a pulse-width modulated code, in which a "1" bit will be manifested by a four millisecond wide high, or logic "1", signal and a "0" bit will be manifested by a one millisecond wide high, or logic "1", signal. The leading edge of each of the pulses sent on output 62 will be separated by eight milliseconds. Further, between each eight pulses a 64 millisecond wide low, or logic "0", signal occurs, manifesting the end of one code and the beginning of the next code. The exact make-up of the signal sent from cable head 14 is shown in FIGS. 8 and 9.

Modulator 64, includes a 49.024 megahertz oscillator 88 which provides a 49.024 megahertz signal at the output thereof to a diode switch 90. A control electrode of diode switch 90 is attached to the output 62 from microprocessor 78 and diode switch 90 is rendered conductive whenever a logic "1" signal is applied from microprocessor 78 to the control electrode thereof. During that period of time, a signal having a frequency of 49.024 megahertz appears at the output of diode switch 90. When the signal of line 62 from microprocessor 78 is at a logic zero, or low state. There is no output from diode switch 90. The output signal of diode switch 90 is applied through a filter 92, which eliminates any harmonics or side frequencies, and then amplified by amplifier 94 prior to being provided to mixer 66.

Referring now to FIG. 4, the transponder unit 74 is shown. As will be recalled, the transponder 74 is placed in the home 20 and receive the signal on cable 30 containing both the cable TV signals and the energy management signals provided from cable head 14. First, the received signal is applied to a splitter circuit 96 which provides the TV signals to the TV set 76 and the energy signals to a 49.024 megahertz filter 98. The filtered energy management signal is then amplified by amplifier 100 and applied to a frequency divider 102, which divides the frequency of the 49.024 megahertz signal applied thereto by 256. Divider 102 may simply be a conventional pulse counter which provides one pulse for each 256 pulses provided thereto. Thus, a 191.5 kilohertz signal is provided at the output of divider 102.

The signal from divider 102 is applied through a capacitor 104 and amplifier 106 into the primary of a transformer 108. The secondary of transformer 108 is coupled through a capacitor 110 into the household a.c. line. This may be made by simply attaching a conventional plug to the output side of capacitor 110 and inserting that plug into a conventional wall receptacle. The size of capacitor 110 and the secondary winding of transformer 108 are selected so that the impedance of capacitor 110 at 60 hertz is very high and the impedance of the secondary winding of transformer 108 is very low, whereas at 191.5 kilohertz, the impedance of capacitor 110 is very low and the impedance of the secondary winding of transformer 108 is very high. This allows the provision of a large signal onto the power line, but prevents the 60 hertz signal already on the power line from being applied back into transponder 74 through the primary winding of transformer 108.

Referring again to FIG. 1, it is seen that a plurality of homes 20, 20A . . . 20N may be served by the same power company transformer 26. Thus, any signal applied into the electrical network of any signal home by a transponder 74 will appear on the electrical lines of all of the various homes served by transformer 26. This signal will also be isolated from the rest of the power company's network by transformer 26. If, for some reason, the various transponder 74 signals provided to power lines 28 are out of phase with respect to one another, these signals could potentially cancel each other out and disable the entire energy management scheme. Thus, the signals provided by each transponder 74 coupled in the power system served by a single power company transformer 26 msut be synchronized with each other.

As previously described, each transponder 74 is both a signal receiver (of the 49.024 megahertz signal) and a signal transmitter (of the 191.5 kilohertz signal). Typically, such a signal receiver will use a heterodyne circuit to achieve the required gain and frequency reduction for the output signal. As is well known, however, there may be a phase difference in the output signals of several heterodyne circuits responsive to the same signal. This potential phase difference prevents the use of a heterodyne circuit in transponder 74, since the output signals applied within the same transformer 26 power system must be synchronized. In order to overcome this problem of phase synchronization, a tuned radio frequency receiver and counter are used in each transformer 74 to receive and frequency divide the same 49.024 megahertz signal. Thus, the output of each of the counters will always be in phase with one another since the same signal is always applied to each transponder.

The only time that the output of the several transponders 74 associated with a given transformer 26 will not be the same is if the state of divider 102 for the different transponders 74 is not the same. In order to assure that divider 102 is always in the same state at the beginning of each pulse burst signal, and hence provides synchronous signals, the output from divider 102 is provided through a 20 millisecond retriggerable delay generator 112 to a two millisecond pulse generator 114. The pulse output from generator 114 is then provided to the reset input of divider 102. Circuits 112 and 114 result in the long logic "0" following the trailing edge of the last pulse of each of the eight bit pulse code signals causing divider 102 to be reset during the 64 millisecond separation between codes. Thus, by the time the leading edge of the next eight bit signal is provided to the dividers 102 in the multiple transponder units 74 coupled in the various homes 20 . . . 20N, each of the respective divider circuits 102 will have been reset to the same initial value and thus will provide output signals that are all the same. Further, since each code is provided several times, even if power line noise or a power outage causes the divider circuit 102 to be set differently, only one of the multiple provided signals would be effected and the system would still properly respond to the remaining ones of the multiple provided signals.

Figure 5:
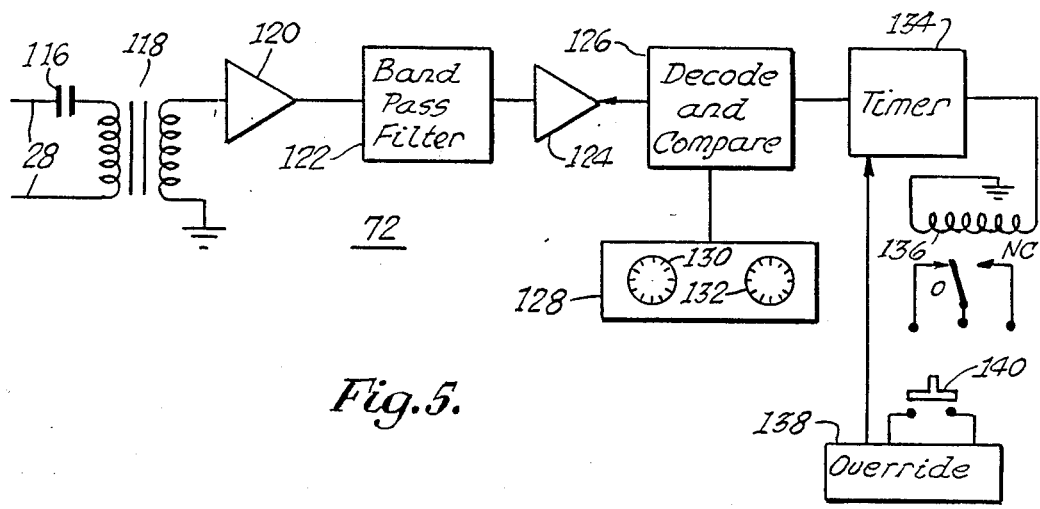
FIG. 5 shows a more detailed block diagram of the responder unit shown in FIG. 2.

Referring now to FIG. 5, one of the responder units 72 is shown in more detail. Responder unit 72 is coupled to the power lines 28 and the signal from power line 28 is provided through a capacitor 116 and a transformer 118, which together act as a high pass filter for the 60 hertz signal. Then, the signal is applied through amplifier and limiter 120 to a band pass filter 122 tuned at 191.5 kilohertz, which filters out the other frequencies, such as noise and interference normally appearing on the power line. This leaves the 191.5 kilohertz energy management coded signal at the output of filter 122, which is then amplified by amplifier 124 and applied to a decode and compare circuit 126. Decode and compare circuit 126 compares each eight bit signal provided thereto with the eight bits set on user settable encoding device 128. Device 128 may include a pair of user settable thumb wheel switches 130 and 132, each of which may be set at any one of sixteen different positions. Thus, by appropriately setting thumb wheel switches 130 and 132, any one of 256 different codes can be entered by encoding device 128 into the decode and compare circuit 126. As will be explained hereafter with respect to FIGS. 12A–12F, the homeowner using responder 72 selects the particular setting based on the homeowner's schedule, the amount of savings desired, and the appliance being managed.

The 256 available settings for encoding device 128 are manifested as an eight bit digital signal provided to decode and compare circuit 126. The eight bit signal applied from amplifier 124 to decode and compare circuit 126 is compared against the eight bit signal from encoding device 128. Since a plurality of identical signals is provided from computer 52 to decode and compare circuit 126, circuit 126 is designed to provide a signal at its output only when it finds at least a plurality of comparisons, such as two out of three or three out of four. The reason for this, of course, is to prevent any spurious signals, which may appear on the power lines due to interference or other reasons, from being decoded as an energy management signal.

Once a proper comparison has occurred in decode and compare circuit 126, an output pulse is provided to timer circuit 134. Timer circuit 134 may be functionally the equivalent to a resettable monostable multivibrator having a four minute time constant. In other words, if no signal is provided from decode and compare circuit 126 to timer circuit 134, the circuit is reset and a low voltage, or logic "0", signal appears at the output thereof. The output signal from timer circuit 134 is provided through the coil of a relay 136, which, as seen in FIG. 5, is a normally closed relay, that is, as long as no signal appears at the output of timer 134, relay 136 remains closed and the appliance being managed operates in its normal mode. If the appliance being managed is, for example, an air conditioner, the output of relay 136 would be coupled in series with the thermostat signals and would allow the thermostat to control the air conditioning appliance in the normal fashion.

However, if signals are applied from decode and compare circuit 126 to timer circuit 134 at least every four minutes, the output of timer circuit 134 becomes and remains high, causing the contact of relay 136 to go to the open position. This position inhibits the appliance from operating in the manner normally intended. Thus, it is seen that the responder device 72 operates in a fail safe mode, in that if energy management signals cease being applied for some reason, such as an equipment malfunction or a power outage at the cable head, the appliance reverts to its normal operation. Stated another way it requires positive action to disable the appliance on the part of the energy management system.

Under certain circumstances the homeowner may desire to manually override the energy management system. For example, the system may be set to turn an air conditioner device off during the period in which a home is normally unoccupied. For instance, if all occupants of the home are away at either school or work during the day, an energy management system schedule can be selected so that the air conditioner is turned off during that part of the day and turned on before the first occupant is expected to return to the home so that the temperature is back to normal upon the return. However, sometimes the normal schedule of the household is changed due to, for example, illness, additional holidays or vacation. In this instance, rather than having to change the setting on encoding device 128, override circuit 138 is provided to override the normal circuit operation of the responder 72. Override circuit 138 includes an override button 140, which when depressed, causes a signal to be provided from override circuit 138 to timer 134. This signal, in effect, prevents timer 134 from providing a signal at its output, and the contacts of relay 136 return to the normally closed position.

The energy management signal scheme itself is used to automatically override timer 134 after it has been set by depressed override button 140. This occurs by the lack of signals being applied to timer 134 for a continuous period of time of, for example, 32 minutes. For every appliance being managed, every selectable schedule must provide, at some point during each 24 hour period, a period of 32 minutes when no signals are applied, so that timer 134 may be reset if it has been set by the depression of the override button 140.

Figure 6:
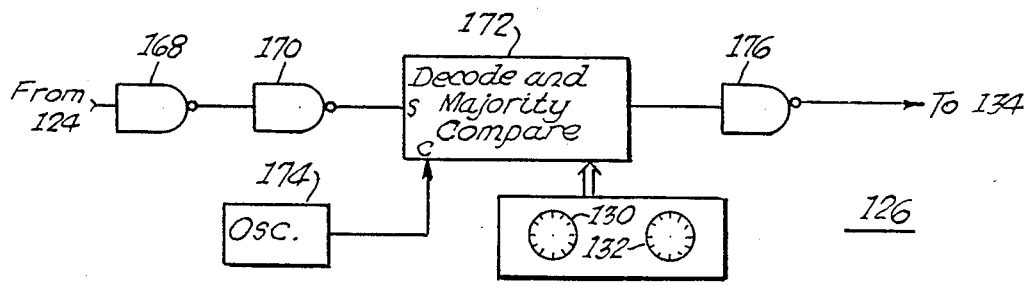
FIG. 6 shows a more detailed block diagram of the decode and compare circuit of the responder shown in FIG. 5.

Referring now to FIG. 6, a detailed schematic of the decode and compare circuit 126 is shown. Circuit 126 includes a pair of inverter 168 and 170 for signal conditioning the signal applied from amplifier 124. The output of inverter 170 is applied to the input of decode and majority compare circuit 172. Circuit 172 also has applied thereto the outputs from each of thumb wheel switches 130 and 132 and the output of an oscillator 174. Oscillator 174 provides clocking signals to circuit 172 to clock in the data applied from inverter 170 into a shift register within circuit 172. During the 64 msec low interval, a comparison occurs within circuit 172 between the data clocked into the shift register and the data applied from thumb wheel switches 130 and 132. When the clocked data is identical to the thumbwheel 130 and 132 data, an internal counter is incremented and when a sufficient number of comparisons are found, the internal counter sends a signal out from circuit 172 and through inverter 176 to Timer 134. The decode and majority compare circuit 172 is commonly found as the receiver unit of garage door openers.

Figure 7:
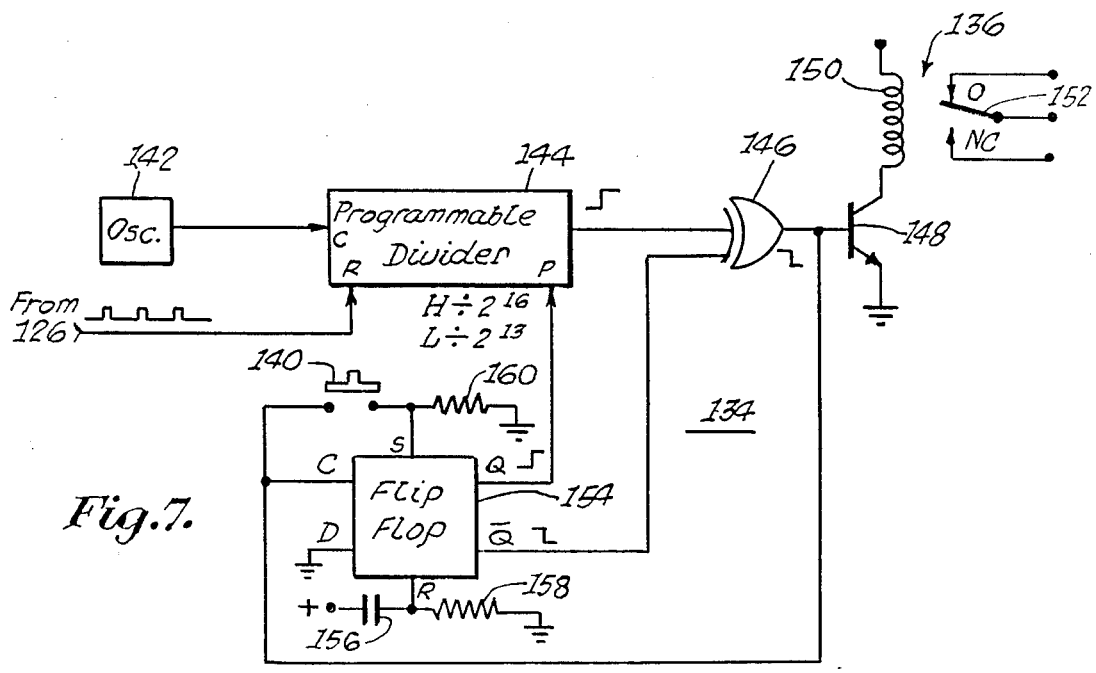
FIG. 7 shows a more detailed block diagram of the timer and override circuit of the responder unit shown in FIG. 5.

Referring now to FIG. 7, a more detailed diagram of the time 134 and override 138 circuits are shown. The timer 134 circuit includes an oscillator 142 and a programmable divider 144 having clock (C), reset (R) and program (P) inputs. The output of oscillator 142 is coupled to the clock (C) input of divider 144 and the signals from decode and compare circuit 126 are provided to the reset (R) input of divider 144. The frequency of oscillator 142 and the divisor of divider 144 are selected so that under normal operation, the output of divider 144 goes from a low value to a high value four minutes after being reset by a signal from decode and compare circuit 126, is provided unless another signal from decode and compare circuit 126 is first provided. Thus, if no signal is provided to the reset input of divider 144 from decode and compare circuit 126 for a period of four minutes, the output of divider 144 becomes logic "1" or a high voltage. The divisor of programmable divider 144 is selectable depending on the value of the signal provided to the program (P) input thereof. If the signal provided to the programmable input of divider 144 is a logic "1", or high voltage signal, the divisor of divider 144 is equal to two the sixteenth power (65,536) and an output thereof will go from low to high thirty-two minutes after the last pulse signal from decode and compare circuit 126 resets the divider 144. On the other hand, if a logic "0", or low voltage signal, is provided to the program input of divider 144, the divisor is equal to two to the thirteenth power (16,384) and an output thereof will go from low to high four minutes after the last pulse signal from decode and compare circuit 126 resets the divider 144. As will be discussed hereafter, a logic "0" signal is applied to the program (P) input of divider 144 unless the override button 140 is depressed.

The output from programmable divider 144 is provided as one input to exclusive OR gate 146, which, in practice, may be included as a part of divider 144. The other input, as will be described hereafter, to exclusive OR gate 146 is a high voltage as long as override button 140 is not depressed. Hence, the output of exclusive OR gate 146 is the opposite of the programmable divider 144 output.

The output from exclusive OR gate 146 is applied to the base of NPN transistor 148. The emitter of transistor 148 is coupled to ground and the collector of transistor 148 is coupled through the relay winding 150 of relay 136 to a source of positive voltage. As long as the voltage applied to the base of transistor 148 is positive, or logic "1", transistor 148 is conductive and current flows through winding 150. This maintains the relay 152 in the open position, as seen in FIG. 7. In this situation the load, which may be the appliance being managed or a thermostat controlling that appliance, is disconnected from the power. This condition will occur whenever signals are decoded by responder 72. Thus, as long as pulses are provided every four minutes, or less, the output from programmable divider 144 will remain low, the output from exclusive OR gate 146 remains high, and the appliance is disabled from drawing power.

Override circuit 138 includes a flip-flop 154 in which the clock (C) input is coupled to the output of exclusive OR gate 146 and the data (D) input is coupled to ground. In addition, flip-flop 154 has a reset (R) input coupled to the junction between capacitor 156 and resistor 158, the other ends of which are respectfully coupled between a source of power and ground respectively, and a set input, which is coupled through resistor 160 to ground and through switch 140 to the c input of flip-flop 154 and the output of exclusive OR gate 148. Coupled in this manner, flip-flop 154 is maintained normally in the reset condition, such that the Q output thereof is normally at a logic "0", or low value, and the NOT-Q output thereof is normally at a logic "1", or high value. The Q output is coupled to the programmable p input of programmable divider 144.

Figure 10:
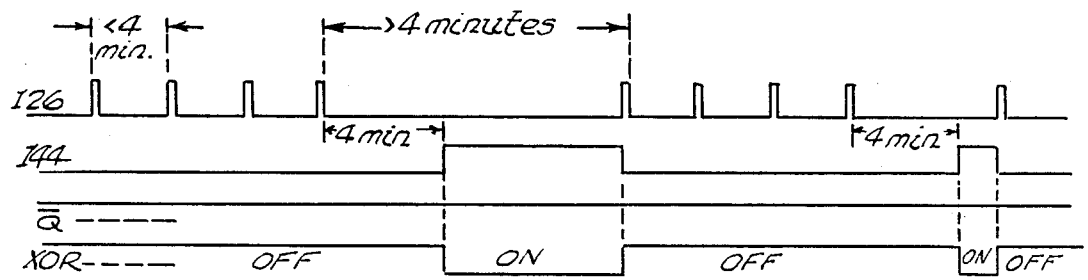
FIG. 10 is a signal diagram useful in understanding the normal operation of the responder unit shown in FIG. 5.
Figure 11:
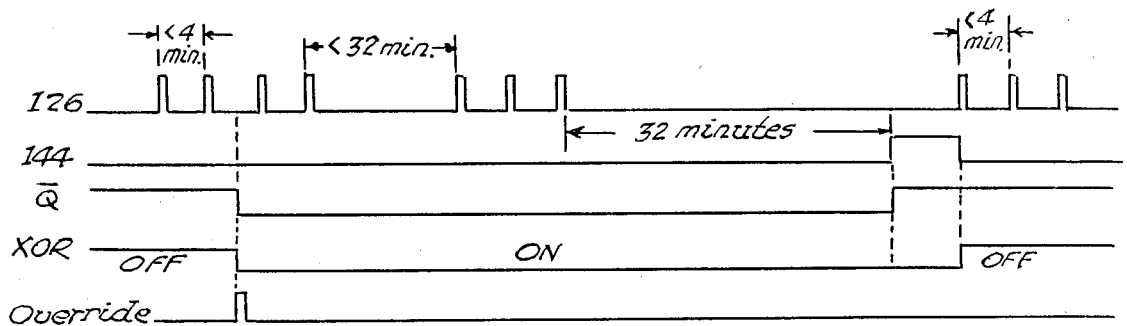
FIG. 11 is a signal diagram useful in understanding the operation of the responder unit shown in FIG. 5 when the override button thereof is depressed.

Referring now to FIGS. 10 and 11, the operation of the timer 134 and override circuits 138 will now be explained. The normal operation, that is the override button 140 has not been depressed, is shown by the waveforms in FIG. 10 and the operation after the override button 140 has been pressed is shown in FIG. 11.

Under normal operation, as long as pulses are provided from decode and compare circuit 126 at least every four minutes, the output of programmable divider 144 is logic "0" and the output of XOR gate 146 is logic "1". This renders transistor 148 conductive and relay 152 is in the open position, thereby disabling the appliance being managed from operating, that is, the appliance is off. Four minutes after the last pulse from decode and compare circuit 126 is applied, the output of divider 144 becomes logic "1", or high, and the output of XOR gate 146 becomes logic "0", or low. This renders transistor 148 nonconductive, allowing relay 152 to be in the closed position and allowing the appliance to operate normally.

Once override button 140 is depressed, which would only occur during a time the appliance being managed is off, the logic "1" voltage at the output of XOR gate 146 is provided through button 140 to set flip-flop 154, thereby causing the Q output to become logic "1" and the NOT-Q output to become logic "0". Since the NOT-Q output of flip-flop 154 is coupled as the second input of XOR gate 146, the output of XOR gate 146 then becomes low, or the same as the output of programmable divider 144. This low output from XOR gate 146 renders transistor 148 nonconductive and current ceases flowing through coil 150. This, in turn, allows relay 152 to return to the normally closed position and the appliance being monitored operates normally.

This situation will remain as long as there are decode and compare circuit 126 pulses provided. After the period of 32 minutes without a decode and compare circuit 126 pulse, the output of programmable divider 144 becomes logic "1" and the output of XOR gate 146 becomes logic "1". The positive going signal from XOR gate 146, which is provided to the clock (C) input of flip-flop 154, clocks in the logic "0" applied to the data (D) input and flip-flop 154 becomes reset. Thereafter, the normal operation resumes and the effects of having depressed the override button 140 are no longer controlling.

Referring now to FIGS. 8 and 9, the type of encoded signal provided from the cable head 14 to cable 18 will not be described. This is the same signal which is received in the home 20 by the transponder 74. The signal on cable 18 is a series of pulses which may either be one millisecond in duration or four milliseconds in duration. The pulses are actually bursts of the 49.024 megahertz signal and the spaces are the absence of the 49.024 megahertz signal. It should be understood that the signal used for the energy management, as depicted in FIGS. 8 and 9, is superimposed over the normal signals flowing on cable 18, such as the cable television signals. These television signals are provided at various modulated frequencies, called channels, and the 49.024 megahertz signal is a subchannel below the normal television signal channels provided on cable 18. The signal provided from transponder 74 appears exactly as shown in FIGS. 8 and 9, except that it is at a frequency of 191.5 kilohertz.

Each of the energy management signals consists of eight pulses provided during a 64 millisecond period, followed by a space of 64 milliseconds. The one millisecond wide pulse represents a logic "0" and the four millisecond wide pulse represents a logic "1". In the case of a logic "0", or one millisecond pulse, a space between the trailing edge of that pulse and the leading edge of the next occurring pulse in the eight bit 64 millisecond signal is 7 milliseconds. On the other hand, the space following a logic "1" bit, or four millisecond pulse, is four milliseconds.

Each of the various encoded signals provided onto cable 18 are provided a plurality of times, such as three or four. This is to allow the responder units to be able to respond to a majority type signal rather than each individual signal. The reason, of course, is to avoid false responses due to noise appearing on the lines.

Referring now to FIGS. 12A-12G, examples of the various schedules which can be used to control appliances are given. FIGS. 12A, 12B, 12C and 12D represent the various types of schedules one would use on a responder 72 associated with an air conditioner type of appliance 70. These air conditioning schedules are dependent upon various parameters, such as, (1) whether somebody is usually home or all occupants are usually away part time, (2) the sleep time of the individual household and (3) the amount of savings (eg. super savings, good savings or modest savings) desired by the homeowner. FIG. 12A represents the situation when, for example, where a husband works and the wife is at home during the day with the children. FIGS. 12B, 12C and 12D represent the situation where both the husband and wire are away at least part of the day and no other occupants are in the house during that period of time. The difference in the schedules shown by FIGS. 12B, 12C and 12D is the amount of energy savings available, that being super savings, good savings or modest savings.

Within each of the schedules shown in FIGS. 12A through 12D, a code is shown in which the letters H=$_{13}$ and V=__ are depicted. The V and H values represent the settings of the thumbwheels 130 and 132, shown in FIG. 5. As will be recalled, each of the thumbwheels 130 and 132 can be set to any number between zero and fifteen. On the responders 72, thumbwheel 130 would be marked, for example, with a V and thumbwheel 132 would be marked with an H.

In order to use the schedules shown in FIGS. 12A through 12D, for example, to control the air conditioner, the homeowner would first determine whether someone is usually home or the occupants are all away part time. If someone is usually home, then the schedule shown in FIG. 12A would be utilized. Next, the occupant would determine what time all members of the household normally sleep and whether they wanted super savings, good savings or modest savings. For example, if the normal sleep hours are midnight to seven A.M. and the homeowner desired super savings, they would set the V thumbwheel 130 to 0 and the H thumbwheel 132 to 3, as indicated on the third column of the super savings row in FIG. 12A.

If the occupants are all away part of the time, then one of FIGS. 12B, 12C and 12D would be utilized, depending on the type of savings the homeowner desired. For example, if the homeowner desired super savings, then the schedule in FIG. 12B would be utilized. In this instance, it would be necessary for the person to determine the period of time in which the home was unoccupied, along the first column shown in FIG. 12B. For example, if the occupants of the home were all away from 8 A.M. to 5 P.M. and their normal sleep time was midnight to 7 A.M., then the V thumbwheel 130 would be set to 1 and the H thumbwheel 132 would be set to 8, as indicated in the fourth column of the 8 A.M. to 5 P.M. row.

FIGS. 12E, 12F and 12G respectively show similar scheduling for outside lights, water heaters and pumps used, for example, for swimming pools or hot tubs. Other types of schedules could easily be developed using the examples shown in FIGS. 12A through 12G to control any item desired by the homeowner.

In certain instances the homeowner will desire to have the appliances shut-off for the vast majority of time, such as when the family takes a vacation. In this instance, as indicated at the bottom of FIGS. 12A through 12D and 12F the settings for of the V and H thumbwheels 130 and 132 would each be 15. In this instance, the unit would be turned on only for a short period of, for example, forty-five minutes during each twenty-four hour period. This would be necessary in the case of the air conditioner to remove any humidity from the house. Further, this period of on time is required to reset the effects each of pressing override button 140. Other than during this 45 minute period, the appliances would be maintained off, greatly reducing the energy cost for the unoccupied home.

Referring now to FIGS. 13A through 13I, examples of the manner in which the cable head computer 48 and signal transmitting computer 52 operate in providing the signals relating to selected schedules will now be described. It should be recalled that during any four minute interval, all schedules which require that an appliance be turned off will have a signal provided a plurality of times. The diagram shown in FIGS. 13A through 13I are useful in understanding when a particular schedule calls for a signal to be provided. These charts are given as examples with respect to an air conditioner to be controlled. FIGS. 13A, 13B and 13C show the different schedules for controlling an air conditioner, under the schedule setting shown in FIG. 12A, when somebody is usually home and the sleeptime is midnight to seven A.M. The difference between FIGS. 13A, 13B and 13C is in the amount of savings required, that is, whether super savings, good savings or modest savings is desired. FIGS. 13D, 13E and 13F are a similar example for a person which is usually away from eight A.M. to five P.M. and sleeps from midnight to seven A.M. FIGS. 13G and 13H show the difference in schedules based on different sleep times and FIG. 13I shows the difference in schedules based on amount of savings desired.

Referring first to FIG. 13A, a chart useful in understanding the timing sequence for which cable head computer 48 controls signal transmitting computer 52 to provide signals over cable 18 is shown. The chart in FIG. 13A is based on the assumption that the sleep time in the home being managed is from midnight to seven A.M. and that the homeowner has determined that they want super savings. Further, the chart in FIG. 13A is based on the assumption that somebody is usually in the home all day long. Hence, the thumbwheel 130 and 132 settings would be H=3 and V=0.

The left portion of the chart in FIG. 13A is the day schedule 162. This schedule shows the various days of the week Sunday through Saturday, it being understood that holidays are treated as Sundays. Associated with each day of the week is a time schedule (TS#). In FIG. 13A, since everyday is the same in that somebody is usually home, each of the time schedules for the parameter chosen are TS4. TS4 is shown in FIG. 13A in the center section, or time schedule portion 164.

In determining the time schedules for the various parameters selected, certain common elements are utilized. First, during the sleep time period, the best energy saving is set to occur from one hour after the normal bedtime and until one hour before the normal rise time. For the forty-five minutes following the one hour before the normal rise time, the air conditioner unit is allowed to run at its maximum that is, it is only controlled by the normal thermostat setting. Thereafter, normal daytime energy management occurs. The reason that the air conditioner is allowed to run at its maximum on time during the forty-five minutes following one hour before normal awake time is so that the person is comfortable when they awake and to provide for override removal.

The manner in which the energy management scheme of the subject invention operates is to inhibit the appliance from responding to normal thermostatic control for a certain period during a set interval. For example, the interval may be each half hour and the unit may be inhibited from operating for a certain number of minutes during each half hour interval. This inhibition period is called the cycle time, and as seen in the time schedule 164 portion of FIG. 13A, the cycle time is under the column CT#. The number in this column indicates the maximum time that the unit may be turned off during any given thirty minute interval. In actual real time management, this number may be less due to other factors such as the weather. The real time off time will be determined by computer 48, after it reads the weather information from RAM 54. The number shown in the CT# column in FIG. 13A is the maximum off time during the defined interval.

Referring now to the specific example to which the information in FIG. 13A relates, that is a person is usually home, sleeps from midnight to seven A.M. and desires super savings, it is seen that from the period midnight, which is depicted as 0:00 until 1:00 A.M., the unit is inhibited eight minutes during each thirty minutes. From 1:00 A.M. until 6:00 A.M., which is one hour before the arise time at 7:00 A.M., the unit is inhibited fifteen minutes out of each thirty. This generally will allow the temperature in the home to rise during the sleep time period, but the occupants will be unaware of the rise. From 6:00 A.M. to 6:45 A.M. the air conditioner unit is not inhibited at all, so that the house may be cooled off to a comfortable temperature at the time the occupants awake. Thereafter, from 6:45 A.M. until 2:00 P.M., entered as 14:00 on the schedule, the unit is inhibited 12 minutes out of each half hour. Thereafter, from 14:00 until the following midnight, the unit is inhibited eight minutes for each half hour. The reason that the unit is inhibited less time after 2:00 P.M. is that this is the hottest portion of the day inside the residence. Maximum outside temperature and solar radiation are delayed by the insulation of the structure.

The right hand portion of the chart in FIG. 13A is the cycle time information schedule 166. The cycle time information includes the time interval to which the cycle time relates, whether it is winter or summer, the maximum off time at any given instant, the minimum off time at any given instant and the cycle time weather factor. In FIG. 13A the interval is set at thirty minutes, and the zero following the winter/entry indicates that it is summertime. A "1" in this position would indicate that it is wintertime. The eight following the max off entry indicates that at that instant in time, the maximum off time is eight minutes. In FIGS. 13A through 13I, the entry for max off is assumed to be the entry at midnight. It is also seen that a minimum off time of one minute for each thirty minutes will always occur regardless of other factors. In FIGS. 13A to 13I it is also assumed that the cycle time weather factor represents weather conditions that have no effect. This number may vary, depending on the information provided from the weather instruments 58, between 1 and 50. Programs and tables within the memory of computer 48 translate the information provided from the weather instruments 50 and vary the cycle time number values set out in the time schedules 164. For the example it is assumed that the weather factor is one indicating that the time schedules are as shown in FIG. 13A through 13I.

Referring now to the example depicted by FIG. 13B, the same assumptions are made in FIG. 13B as were made in FIG. 13A, with the exception that the homeowner desires good savings rather than super savings. In the case of air conditioning, this means that the home will be slightly cooler during the times of cycling because the air conditioning unit will be allowed to run for a longer period of time, but the energy saving would be less. It is seen that in the day schedule 162 of FIG. 13B, a time schedule TS7 is used, rather than Schedule TS4, as was the case in FIG. 13A. In the time schedule portion 164 of FIG. 13B, it is seen that the times under the on and off columns are identical to those shown in FIG. 13A, but the cycle time number is different. Generally for the good savings shown in FIG. 13B the air conditioner is allowed to run for a longer period of time compared to the time it allowed to run for super savings. Thus, the off time depicted under the CT# is less. Thus, from the period of time 1:00 A.M. to 6:00 A.M., the air conditioner is only inhibited for twelve minutes out of every thirty minutes, rather than the fifteen minutes as was the case in FIG. 13A. Thus, the temperature in the home will not rise as much. It should be understood that the amount of the temperature rise is a function of such things as insulation and building construction. Hence, if a three degree rise is to be tolerated, super savings will work for some homes, whereas good or modest savings will only be usable for other homes to keep the temperature rise to three degrees.

Referring to FIG. 13C, the same assumptions are again made, with the exception that only a modest savings is required. Here, the time schedule number chart is 18 and the maximum off times are again reduced from those times shown in FIG. 13A and 13B.

Referring now to FIG. 13D, an air conditioning schedule is shown for a home in which everybody is normally away during the period 8:00 A.M. to 5:00 P.M. Otherwise the assumptions are the same as made with respect to FIG. 13A. For FIG. 13D, a setting of H=8 and V=1 on the responder device 72 associated with the air conditioner would be set where the normal sleep time is midnight to 8:00 A.M. and super savings were desired. In this instance, it is seen that under the day schedule 162, the Monday through Friday time schedule is TS27, whereas Saturday, Sunday and Holidays time schedule is TS4, shown in FIG. 13A. This is because, the assumption is made that the homeowners would be home on the weekend and holidays and only away during weekdays. According to time schedule TS27, the time from midnight to 8:00 A.M. is exactly the same as shown in FIG. 13A since people are in the home at that time. However, there is no entry between 8:00 A.M. and 4:30 P.M. or 16:30. After 16:30, until the following midnight, again the time schedule is as it was in FIG. 13A. The result of no entry during the period 8:00 A.M. until 4:30 P.M., is that signals are continuously provided to maintain the air conditioner off. The 4:30 P.M. time is selected because it is one half hour before the first person returns to the home; thus, by 5:00 P.M. when people return, the home will be at a comfortable level. However, from 8:00 A.M. until 4:30 P.M., no energy was utilized.

Referring to FIGS. 13E and 13F, similar charts are shown for good saving and modest saving. Again, it is seen that the time schedules numbers change and the cycle time numbers are reduced. Hence, the home remains cooler, but the energy savings is less.

Referring now to FIG. 13G, a chart for different sleep times and different awake times is shown. In FIG. 13H, again different sleep times are shown and in FIG. 13I different savings amounts are shown. These charts can all be compared with one another and with the charts in FIGS. 13D, 13E and 13F in order to see how the unit manages the energy consumption based on the different parameters used for the home occupants.

Figure 14:
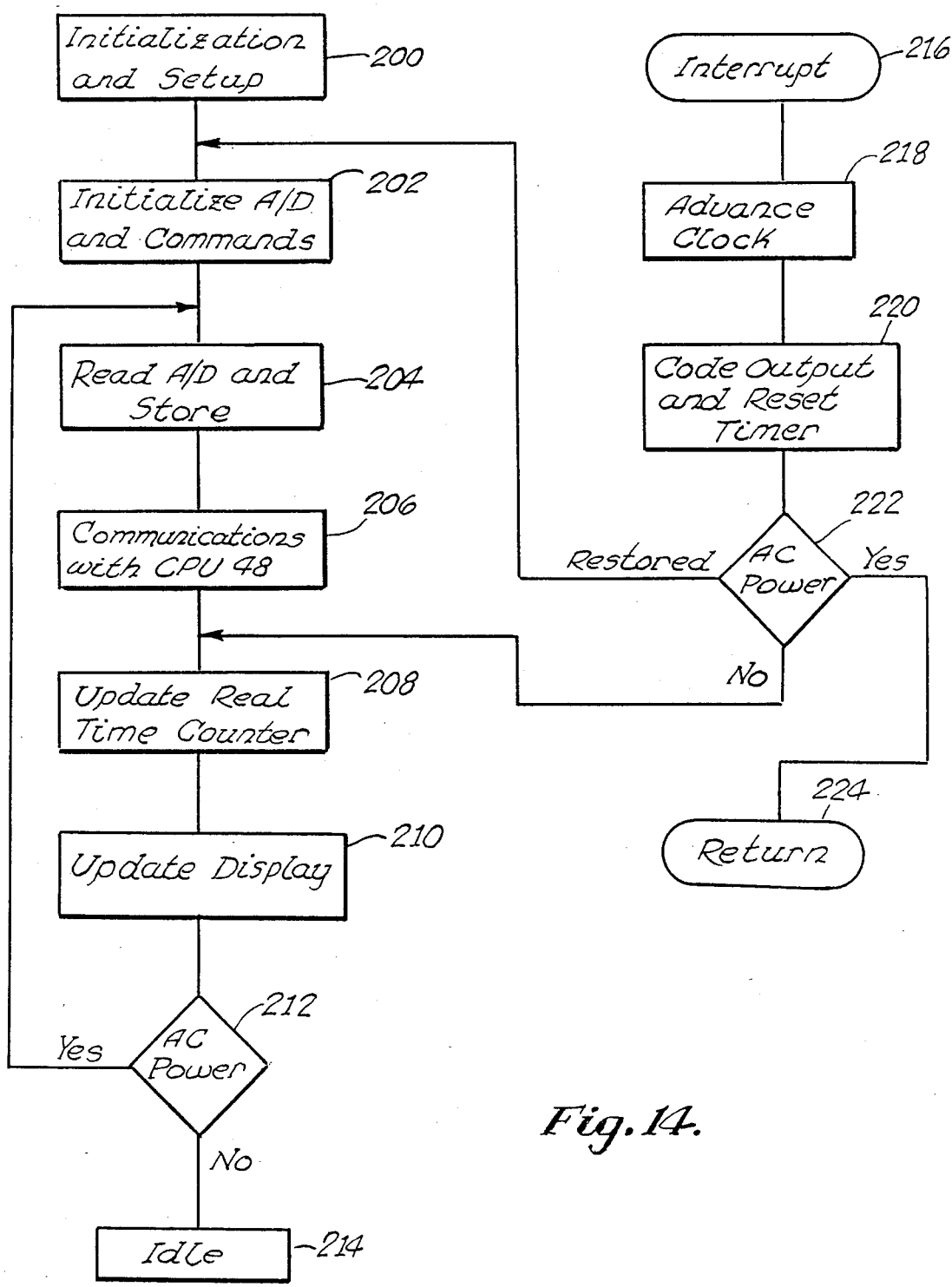
FIG. 14 is a flow diagram useful in understanding the generation of the signals from the signal generating computer shown in FIG. 2.

Referring not to FIG. 14, a flow diagram for the operation of computer 52, shown in FIG. 2, is given. This flow diagram indicates how the signals are provided based on the information stored in the RAM 54 associated with computer 52. When computer 52 is first turned on, it goes through an initialization and set-up routine, as indicated by block 200. Generally, during this period, the registers of microprocessor 78 are reset, the timer 84 is reset, RAM 54, except the 256 command buffer, are reset and the like. Next, according to block 202, the A/D convertor 60 is initialized and the command buffer, consisting of the first 256 bits of RAM 56, is initialized. In initializing the command buffer, a one bit is placed in each of the 256 bit locations. Thus, when the first signals are sent out, if nothing further happened, each of the schedules would manifest that a device is to be turned off. As will be appreciated hereafter, the purpose of this initialization is to prevent area wide power surges when power is returned after a local a.c. power failure at the cable head.

Next, according to Block 204, the A/D convertor 60 values are read and stored in the appropriated locations of RAM 54. Then, according to block 206, any communication which is required to occur between computer 48 and computer 52 occurs. This communication occurs by computer 48 sending signals to computer 52 indicating that it is ready to communicate and then waiting for appropriate communication from computer 52. During this period of time, computer 48 will update the values in the command portion of RAM 54 and will read the values of the A/D words in RAM 54 in order to modify its schedules in accordance with the weather information stored in the A/D words of RAM 54. Any other required communication, such as the number of shots or correcting time and date information and the like will also occur during this period.

Next, according to block 208, the real time counter, maintained in RAM 54 by processor 78, is updated. This occurs by processor 78 looking at the last increment of time added during the interrupt routine, which will be described hereafter, and adding that value to the time and date registers. Lastly, any information which is required to be displayed is provided by processor 78 of CPU 52 to a liquid crystal display associated therewith as indicated by block 210. Such a display is not shown in FIG. 3, but it should be understood that it could be easily added in a known manner.

Next, according to block 212, a determination is made whether there is a.c. power being applied to computer 52. Under normal circumstances the a.c. power is applied and a return preceeding block 204 occurs and blocks 204, 206, 208, 210 and 212 are continuously repeated. If at block 212 it were determined that the a.c. power had failed, either due to a power outage at the cable head or an equipment malfunction, then, according to block 214, microprocessor 78 goes into the idle state. During the idle state, nothing occurs and no power is drawn. The only thing which can take microprocessor 78 out of the idle state is another interrupt applied thereto.

As processor 78 continuously cycles through the loop consisting of blocks 204, 206, 208, 210 and 212, timer 84 is counting the time until it reaches a value previously set therein. When this occurs, timer 84 causes an interrupt, as indicated at block 216 in FIG. 14. As with any interrupt, this stops the processing through the main cycle through which processor 78 was executing and causes a new interrupt routine to be executed. Normally, upon completion of the execution of the interrupt routine, a return to the interrupted address of the main routine occurs and continuation with the original processing continues. In the interrupt routine 216, the first thing which occurs is that the clock is advance, as indicated by block 218. This advance is equal to the value of the last setting of the timer 84. It is the value placed in the clock here which is used at block 208 to update the real time counter to keep track of the time.

Next, according to block 220, a new code is provided at the output of microprocessor 78 and timer 84 is reset to a new value. The code provided from microprocessor 78 is merely a change of state for the signal on line 62. From FIG. 8, it is seen that the output signal merely changes states at specified times and it is the times between selected ones of those change of state that determines the value of the bit. Thus, a zero bit is high for one millisecond and low for seven milliseconds and a one bit is high for four milliseconds and low for four milliseconds. Between each block of eight bits, is a low period of sixty-four milliseconds. However, this low period is, in fact, increased by the low period of the eighth bit of the code, which is either four milliseconds or seven milliseconds. Thus, it can be stated that the following key times are critical in a generation of the pulse with modulated code provided from microprocessor 78: one milliseconds, four milliseconds, seven milliseconds, sixty-eight milliseconds and seventy-one milliseconds. These key times are the ones to which timer 84 is set as long as the a.c. power is provided. The particular time is determined by microprocessor 78 looking at the state of its output 62 and if the state is low, the value of the next bit to be provided or if it is high, the value and position of the last bit provided. From these determinations, microprocessor 78 can determine the next proper setting for timer 84. It should be recalled that microprocessor 78 provides the address code for each location of the 256 bit command buffer portion of RAM 56 containing a logic "1" bit the number of times defined by the contents of the "Number of Responder Shots" word of RAM 56.

Next, according to block 222, a determination is made whether the a.c. power is properly being applied. If the power is properly being applied, then, according to block 224, a return to the interrupted address of the main flow, shown on the left hand side of FIG. 14, occurs and processing along the main block continues as previously described. However, if the a.c. power is determined to be off at block 222, then a transfer to block 208 occurs, where new instructions interrupt the idle state and processing continues to update the real time counter and then return to the idle state. This will continue until the next interrupt occurs. The first time the a.c. power is determined to be off at block 222, a flag is set, which is used in several places throughout the program. Among these places, is at block 218, where the clock time is advanced by one hundred milliseconds and at block 220, where the timer is set to one hundred milliseconds. Thus, as long as the power is off, the only function occuring is the maintaining of the clock in increments of a tenth of a second.

Once power is finally restored, then, at block 222, the first indication of this is detected, as indicated by the restored output from block 222, and a transfer of the main processing routine beginning with block 202 occurs, where initialization of the A/D and the commands portion of RAM 54 occur as previously explained. In this instance, the initialization causes all one bits to be transferred to the command portion of RAM 54. Thus, immediately after a power failure all appliances are turned off. The purpose for this is to prevent any mass of surge on the power line when all appliances turn on at the same time. This is important for two reasons. First, the power company cannot tolerate a massive load at a particular instance of time on its system. Second, many power users pay an electric rate based on a peak demand. By turning off all of the monitored units, the peak demand can be controlled and thereby save the customer considerable sums on the power bill.

Figure 15:
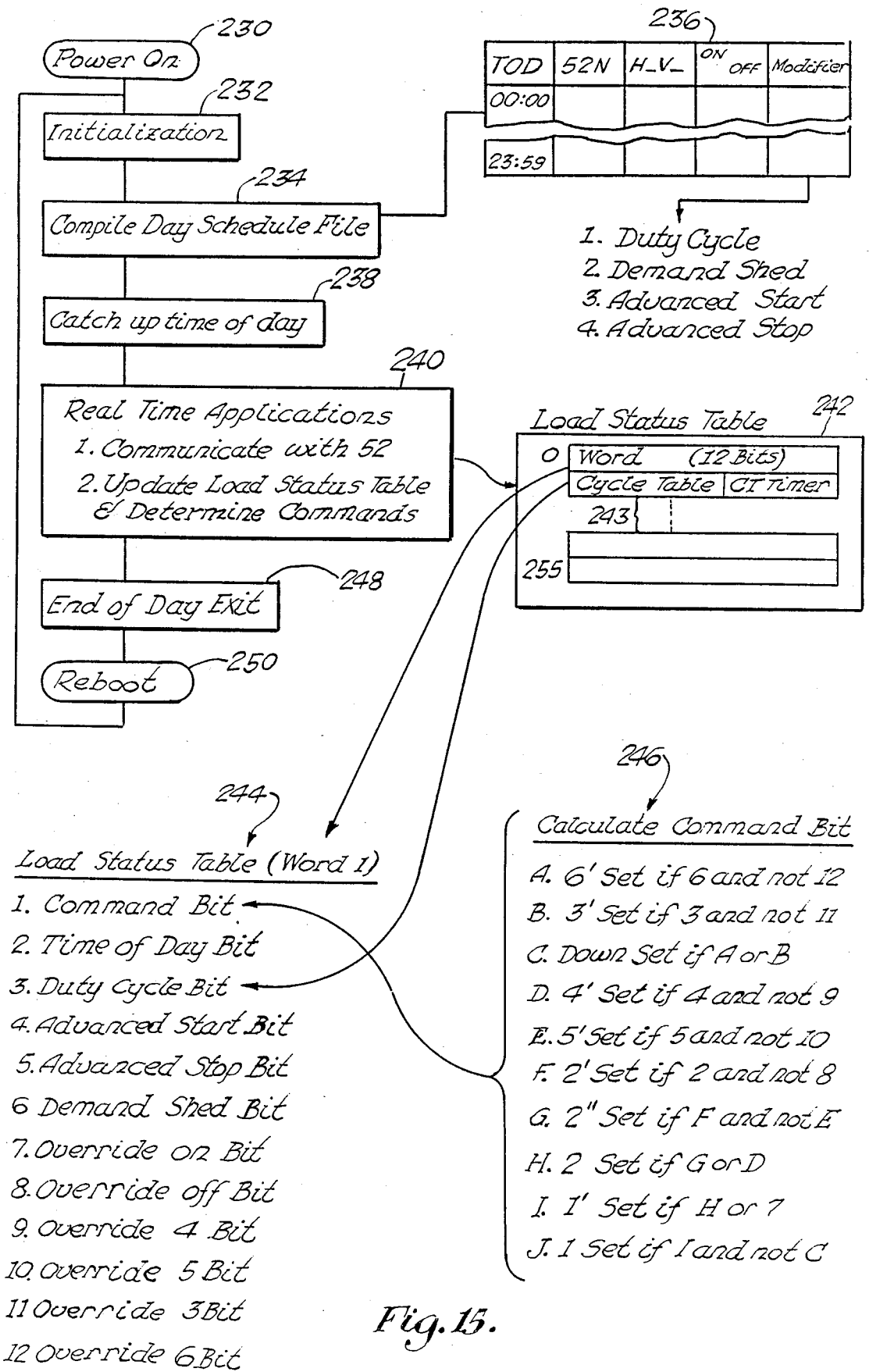
FIG. 15 is a flow diagram useful in understanding how the signal processing computer is controlled by the cable head computer.

Referring now to FIG. 15, a flow diagram for the cable head computer 48 is shown. Generally cable head computer 48 determines the proper information to be placed in the command buffer of RAM 54 at each instant of time. Computer 48 operates on a twenty-four hour day schedule from time 00:00, just past midnight until time 23:59 just before the next midnight. Thereafter, computer 48 automatically reboots to recompile data for the next day. During the reboot procedure tables based on the schedules, examples of which are shown in FIGS. 12 and 13, for the forthcoming day are generated and then during the day, as data is to be provided, the tables stored in computer 48 are modified by appropriate information from either the weather instruments 58 or the operator. Further modifications to the schedules can result from a global demand control signal from the power company. This is referred to in FIG. 15 as a demand shed situation in which selected units are automatically turned off on a priority and time limited basis. In a demand shed situation, for example, water heaters would be the first items turned off, whereas household lights would be among the last items turned off. Various priorities of different appliances would be generated within the programs controlling computer 48 so that the lowest priority items, such as water heaters would be turned off first and if additional demand shed were required, the next set of priority items, such as air conditioners, would be turned off. Again, within the priority system, the water heaters or air conditioners to be turned off could be rotated off for periods of time among large groups of users of the energy management system.

Referring now specifically to the block diagram in FIG. 15, block 230 indicates that first power is initially turned on. Next, according to block 232, an initialization procedure occurs in which normal program compilations occur. Further, the time and date information at power on time is entered into the system.

Next, according to block 234, the time of day schedule is loaded and compiled into the system. The time of day schedule is shown generally at 236 and is a table starting at time 0:00 and extending to time 23:59 for each of the H=_V=_ settings which could occur for that particular day at any given time. Within the time of day schedule 236 is included an entry for which of the potential multiple signal transmitting computers 52 ... 52N is to be utilized. Further, an ON/OFF state setting bit is utilized and a modifier structure is utilized for each time and H=_, V=_ setting. The modifiers can include one or more of different modification schemes, such as (1) the duty cycle, which would be modified for, example, weather information, (2) demand shed, which would be modified by an appropriate signal from the power company, (3) advance start and (4) advance stop. The advance start and advance stop modifications could be either operator controlled or calculated based on information from, for example, the weather instrumentation 58. An example of an advanced start or an advanced stop is the time that air conditioners are to be turned on based on the anticipated return to the home of the occupants. As shown in the schedules in FIGS. 12 and 13, this has been inserted for default condition, but it can be modified so that on hot days the advance start time is longer than on cool days. A similar management could also occur before people leave the home that is, the air conditioner, for example, could be turned off ten minutes before they leave on hot days or thirty minutes before they leave on cooler days.

Once the time of day schedule is compiled and loaded, as required by block 234, computer 48 then catches up to the appropriate time on the schedule. Normally, when the rebooting occurs at midnight, computer 48 will initially be pointing to the proper time of 0:00. However, in the event of a power failure at the cable head, the power may return at any time causing a reboot and it is necessary for computer 48 to catch up to that time. The actual time will have been maintained in the signal transmitting computer 52 due to the battery backup. This time will be read by computer 48 and computer 48 will force itself to the proper time on the schedule 236.

Once computer 48 is caught up, as indicated at block 238, it begins its real time applications, as indicated at block 240. These applications are first, communicating with signal transmitting computers 52 and second, updating the load status table and determining the commands to be provided to computers 52. The manner in which computer 48 communicates with the signal transmitting computers 52 is by conventional polling techniques. When computer 48 has information to be transmitted to computers 52, it sends an appropriate polling signal and at the appropriate point in the flow cycle of computers 52, the communications link is established. This occurs, for example, at block 206 in FIG. 14. Thereafter, computer 48 writes the appropriate information in RAM 54 or reads the appropriate information from RAM 54.

The command information sent from computer 48 to signal transmitting computers 52, which determines which coded signals are sent to the various responder devices, is calculated in the Load Status Table 242. Load Status Table 242 consists of 256 multiword entries. Each of the 256 multiword entries is associated with one of the selectable schedules. Each of the status bit words 244 of the Load Status Tables 242 includes twelve data bits, cycle table information and cycle timer information. The twelve bits of the status table are:
1. Command bit,
2. Time Of Day bit,
3. Duty Cycle bit,
4. Advance Start bit,
5. Advance Stop bit,
6. Demand Shed bit,
7. Override On bit,
8. Override Off bit,
9. Override Advance Start bit,
10. Override Advance Stop bit,
11. Override Duty Cycle bit,
12. Override Demand Shed bit.

The command bit is the bit to be sent from computer 48 to RAM 54 of signal transmitting computers 52 and will be stored in the location of the command buffer addressed by the particular H=_ and V=_ address of the schedule for which the command bit is being determined. The second through six bits of the Load Status Table are internal bits used within the system and the seven through twelve bits are operator controlled bits, which can be entered to override any of the automatic functions. The time of day bit is controlled by the ON/OFF state setting which is read from the time of day schedule 236 entry for the then existing time of day. The duty cycle bit may be calculated based on the weather information or other information contained in the cycle table portion of modifier portion of the Load Status Table 242 and will be on or off to define the length of the duty cycle. In a similar manner, the advance start, advance stop and advance shed bits are determined in response to the modifiers for these functions from table 236.

The manner in which the command bit is calculated is shown in the calculate command bit portion 246 in FIG. 15. The numbers used in the calculations in portion 246 refer to the bit numbers of load status table word 244 and the letters refer to the calculation performed in the calculations portion 246. The final calculation determines the command bit which ultimately is sent to the signal transmitting computers 52.

The real time applications in block 240 continue for the remainder of the day until such time as the end of the day is determined and the time of day exit routine is executed at block 248. This routine shuts down the program and ultimately, at block 250, the computer is rebooted and a return to the initialization routine at 2:30 occurs for the next succeeding day.

While the subject energy management system has been shown using a cable television cable media to transmit signals to the individual homes, or other premises, it should be understood that other types of transmission mediums could also be used. For example, the energy management signals could be sent over telephone lines or as a subcarrier of an FM radio or television signal. Further, the responder units could be directly wired to the transponder rather than using the electric power lines. In addition, if more than 256 different schedules per computer 52 were required, either a greater than eight bit coding scheme could be used, or a tertiary coding scheme, rather than binary, could be used.

What is claimed is:

1. An energy management system for managing the energy usage of an appliance in accordance with a user selected one of a plurality of different predefined schedule entries, each predefined schedule entry defining different times periods and amounts of management within said defined period, said system comprising:

a central signal transmitting unit for providing encoded signals, one after another, each encoded signal manifesting the code of a schedule entry that energy management is to then occur according to that defined schedule entry; and a responder unit coupled in circuit with said appliance, said responder unit including user settable encoding means and having said transmitting unit signals applied thereto, said responder unit managing the energy usage of said appliance by responding to only those encoded transmitting unit signals having the same code as the code set on said user settable encoding means;

said central unit signals being generated without designating said responder unit.

2. The invention according to claim 1 wherein said central unit includes processor means for converting each of said schedules into a table organized by time of day and schedule code defining management at that time of day and for transmitting, at each time of day entry, all of the codes defining energy management at that time of day.

3. The invention according to claim 2 wherein said central unit includes modulation means for modulating the processor means signals for transmission.

4. The invention according to claim 3 wherein each area to be managed includes a plurality of appliances, each of which has a responder unit coupled in circuit therewith, to be managed and further includes transponder means responsive to said modulated processor means signals for providing signals to each of said responder units in said area.

5. The invention according to claim 4 wherein said transponder means includes means to transmit signals to said responder units over conventional power lines preexisting in said area.

6. The invention according to claim 5:
wherein a plurality of areas on a common power line transformer have appliances which have energy use managed, each such area including a transponder means and a responder unit for appliance having energy usage managed; and
wherein said signals transmitted by each transponder means are synchronized with respect to one another.

7. The invention according to claim 6 wherein each transponder means includes means for providing each coded signal to said power lines and means to reset said means for providing thereof after each coded signal is provided to said power lines.

8. The invention according to claim 5:
wherein a plurality of areas on a common power line transformer have appliances which have energy use managed, each such area including a transponder means and a responder unit for appliance having energy usage managed; and
wherein each transponder means includes means for providing each coded signal to said power lines and means to reset said means for providing thereof after each coded signal is provided to said power lines.

9. The invention according to claim 1 wherein each area to be managed includes a plurality of appliances, each of which has a responder unit coupled in circuit therewith, to be managed, said system further including at least one transponder means for each area to be managed which responds to said transmitting unit signals and provides corresponding encoded signals to each of said responder units.

10. The invention according to claim 9 wherein said transponder means includes means to transmit signals to said responder units over conventional power lines preexisting in said area.

11. The invention according to claim 10:
wherein a plurality of areas on a common power line transformer have appliances which have energy use managed, each such area including a transponder means and a responder unit for appliance having energy usage managed; and
wherein said signals transmitted by each transponder means are synchronized with respect to one another.

12. The invention according to claim 11 where each transponder means includes means for providing each coded signal to said power lines and means to reset said means for providing thereof after each coded signal is provided to said power lines.

13. The invention according to claim 10 wherein each transponder means includes means for providing each coded signal to said power lines and means to reset said means for providing thereof after each coded signal is provided to said power lines.

14. The invention according to claim 1 wherein each of said responder units includes timer means for managing said appliance for a fixed time after responding to a coded signal applied thereto.

15. The invention according to claim 14 wherein said transmitting unit provides each encoded signal of the same code not less often than said fixed time apart, as long as said schedule manifested by said code defines energy management of said appliance.

16. The invention according to claim 15:
wherein each encoded signal includes a plurality of identical series of pulses, each of which series manifests the code of the same schedule; and
wherein said responder unit responds to said encoded signal whenever it recognizes more than one series of said plurality of identical series of pulses.

17. The invention according to claim 14 wherein said central unit includes modulation means for modulating the processor means signals for transmission.

18. The invention according to claim 1:
wherein each encoded signal includes a plurality of identical series of pulses, each of which series manifests the code of the same schedule; and
wherein said responder unit responds to said encoded signal whenever it recognizes more than one series of said plurality of identical series of pulses.

19. The invention according to claim 1:
wherein said transmitting unit transmits said encoded signals over a television cable to a plurality of cable subscribers stations simultaneously; and
wherein each cable subscriber station includes transponder means, in response to the transmitting unit signals on said cable, for providing correspondingly coded signals to the conventional electric power lines extending throughout said station; and
wherein said system includes at least one responder unit in each station coupled in circuit with an appliance to be managed, said responder units being coupled to said electric power lines in said station.

20. The invention according to claim 19 wherein said signals transmitted by said transponder means are synchronized with respect to one another.

21. The invention according to claim 20 wherein said transponder means includes means for providing each coded signal to said power lines and means to reset said means for providing thereof after each coded signal is provided to said power lines.

22. The invention according to claim 21 wherein each of said responder units includes timer means for managing said appliance for a fixed time after responding to a coded signal applied thereto.

23. The invention according to claim 22 wherein said transmitting unit provides each encoded signal of the same code not less often than said fixed time apart, as long as said schedule manifested by said code defines energy management of said appliance.

24. The invention according to claim 23:
wherein each encoded signal includes a plurality of identical series of pulses, each of which series manifests the code of the same schedule; and
wherein said responder unit responds to said encoded signal whenever it recognizes more than one series of said plurality of identical series of pulses.

25. The invention according to claim 24 wherein said central unit includes processor means for converting each of said schedules into a table organized by time of day and schedule code defining management at that time of day and for transmitting, at each time of day entry, all of the codes defining energy management is to occur at that time of day.

* * * * *